(12) United States Patent
Crafts et al.

(10) Patent No.: US 12,144,081 B2
(45) Date of Patent: *Nov. 12, 2024

(54) COMMISSIONING LOAD CONTROL SYSTEMS

(71) Applicant: Lutron Technology Company LLC, Coopersburg, PA (US)

(72) Inventors: Jordan H. Crafts, Bethlehem, PA (US); William Bryce Fricke, Bethlehem, PA (US); Stephen M. Ludwig, Jr., Whitehall, PA (US); Jonathan T. Lenz, Waltham, MA (US); Bryan Robert Barnes, Lansdale, PA (US); Kyle Thomas Barco, Bethlehem, PA (US)

(73) Assignee: Lutron Technology Company LLC, Coopersburg, PA (US)

( * ) Notice: Subject to any disclaimer, the term of this patent is extended or adjusted under 35 U.S.C. 154(b) by 196 days.

This patent is subject to a terminal disclaimer.

(21) Appl. No.: 17/509,371

(22) Filed: Oct. 25, 2021

(65) Prior Publication Data

US 2022/0046780 A1 Feb. 10, 2022

Related U.S. Application Data

(63) Continuation of application No. 16/864,788, filed on May 1, 2020, now Pat. No. 11,160,154, which is a
(Continued)

(51) Int. Cl.
*G08C 17/02* (2006.01)
*H02J 4/00* (2006.01)
*H05B 47/19* (2020.01)

(52) U.S. Cl.
CPC ............ *H05B 47/19* (2020.01); *G08C 17/02* (2013.01); *H02J 4/00* (2013.01)

(58) Field of Classification Search
CPC ...... H05B 47/235; H05B 47/25; H05B 47/19; H05B 47/175; H05B 47/135; H05B 47/10; H05B 47/00
See application file for complete search history.

(56) References Cited

U.S. PATENT DOCUMENTS

| 4,864,588 A | 9/1989 | Simpson et al. |
| 5,005,211 A | 4/1991 | Yuhasz |

(Continued)

FOREIGN PATENT DOCUMENTS

| CN | 101641938 A | 2/2010 |
| CN | 102318443 A | 1/2012 |
| EP | 1447946 A2 | 8/2004 |
| WO | 03007665 A1 | 1/2003 |
| WO | 2008123858 A1 | 10/2008 |

OTHER PUBLICATIONS

Lutron, "Energi Save Node Handheld Programming Guide", Lutron Electronics Inc., Coopersburg, PA, 2012, 96 pages.
(Continued)

*Primary Examiner* — Steven Lim
*Assistant Examiner* — Son M Tang
(74) *Attorney, Agent, or Firm* — Michael S. Czarnecki; Glen R. Farbanish; Philip N. Smith

(57) ABSTRACT

A load control system may include load control devices for controlling power provided to an electrical load. The load control devices may include a control-source device and a control-target device. The control-target device may control the power provided to the electrical load based on digital messages received from the control-source device. A user device may discover load control devices when the load control devices are within an established range associated with the user device. The user device and the load control devices may communicate via a wireless communications module. The established range may be adjusted based on the configurable transmit power of the user device or the wire-
(Continued)

less communications module associated with the user device. A discovered control-target device may be associated with a control-source device to enable the control-target device to control the power provided to the electrical load based on digital messages received from the control-source device.

22 Claims, 17 Drawing Sheets

Related U.S. Application Data continuation of application No. 16/013,051, filed on Jun. 20, 2018, now Pat. No. 10,666,060, which is a continuation of application No. 13/830,237, filed on Mar. 14, 2013, now Pat. No. 10,027,127.

(56) References Cited

U.S. PATENT DOCUMENTS

| | | | |
|---|---|---|---|
| 5,146,153 A | 9/1992 | Luchaco et al. | |
| 5,216,692 A | 6/1993 | Ling et al. | |
| 5,237,264 A | 8/1993 | Moseley et al. | |
| 5,239,205 A | 8/1993 | Hoffman et al. | |
| 5,382,947 A | 1/1995 | Thaler et al. | |
| 5,565,855 A | 10/1996 | Knibbe | |
| 5,905,442 A | 5/1999 | Mosebrook et al. | |
| 6,057,756 A | 5/2000 | Engellenner | |
| 6,174,073 B1 | 1/2001 | Regan et al. | |
| 6,567,403 B1 | 5/2003 | Congdon et al. | |
| 6,791,467 B1* | 9/2004 | Ben-Ze'ev | H05B 47/19 345/169 |
| 6,803,728 B2 | 10/2004 | Balasubramaniam et al. | |
| 6,859,644 B2 | 2/2005 | Wang | |
| 6,927,547 B2 | 8/2005 | Walko, Jr. et al. | |
| 6,980,080 B2 | 12/2005 | Christensen et al. | |
| 6,983,783 B2 | 1/2006 | Carmen et al. | |
| 7,002,461 B2 | 2/2006 | Duncan et al. | |
| 7,027,736 B1 | 4/2006 | Mier-Langer et al. | |
| 7,126,291 B2 | 10/2006 | Kruse et al. | |
| 7,277,930 B2 | 10/2007 | Hillis et al. | |
| 7,346,016 B2* | 3/2008 | Nielsen | H04L 67/12 455/352 |
| 7,348,736 B2 | 3/2008 | Piepgras et al. | |
| 7,363,028 B2 | 4/2008 | De Clerq et al. | |
| 7,391,297 B2 | 6/2008 | Cash et al. | |
| 7,397,342 B2 | 7/2008 | Mullet et al. | |
| 7,498,952 B2 | 3/2009 | Newman, Jr. | |
| 7,504,940 B2 | 3/2009 | Luebke et al. | |
| 7,640,007 B2 | 12/2009 | Chen et al. | |
| 7,755,505 B2 | 7/2010 | Johnson et al. | |
| 7,764,162 B2 | 7/2010 | Cash et al. | |
| 7,839,017 B2 | 11/2010 | Huizenga et al. | |
| 7,880,639 B2 | 2/2011 | Courtney et al. | |
| 7,889,051 B1 | 2/2011 | Billig et al. | |
| 7,911,325 B2* | 3/2011 | Nagai | G06K 7/0008 340/10.2 |
| 7,940,167 B2 | 5/2011 | Steiner et al. | |
| 8,009,042 B2 | 8/2011 | Steiner et al. | |
| 8,065,039 B2* | 11/2011 | Mullet | E06B 9/68 700/13 |
| 8,093,993 B2 | 1/2012 | Chou et al. | |
| 8,199,010 B2 | 6/2012 | Sloan et al. | |
| 8,228,163 B2 | 7/2012 | Cash et al. | |
| 8,228,184 B2 | 7/2012 | Blakeley et al. | |
| 8,260,471 B2 | 9/2012 | Storch et al. | |
| 8,306,051 B2 | 11/2012 | Stocker et al. | |
| 8,417,388 B2 | 4/2013 | Altonen et al. | |
| 8,429,435 B1 | 4/2013 | Clayton et al. | |
| 8,598,978 B2* | 12/2013 | Knode | H05B 47/19 340/3.7 |
| 8,605,625 B2 | 12/2013 | Laroia et al. | |
| 8,823,268 B2 | 9/2014 | Saveri, III et al. | |
| 8,893,968 B2 | 11/2014 | Jonsson | |
| 9,148,937 B2 | 9/2015 | Steiner et al. | |
| 9,155,172 B2 | 10/2015 | Baragona et al. | |
| 9,374,874 B1 | 6/2016 | Ewing et al. | |
| 9,553,451 B2 | 1/2017 | Zacharchuk et al. | |
| 10,027,127 B2* | 7/2018 | Crafts | H02J 4/00 |
| 2002/0042282 A1 | 4/2002 | Haupt | |
| 2002/0154025 A1 | 10/2002 | Ling | |
| 2003/0102970 A1 | 6/2003 | Creel et al. | |
| 2004/0201448 A1 | 10/2004 | Wang | |
| 2005/0024228 A1 | 2/2005 | Vignon et al. | |
| 2005/0032540 A1 | 2/2005 | Lee et al. | |
| 2005/0130687 A1 | 6/2005 | Filipovic et al. | |
| 2005/0145688 A1 | 7/2005 | Milenkovic et al. | |
| 2005/0151626 A1 | 7/2005 | Shin et al. | |
| 2005/0245215 A1 | 11/2005 | Abhishek et al. | |
| 2006/0044152 A1 | 3/2006 | Wang | |
| 2006/0109203 A1 | 5/2006 | Huber et al. | |
| 2007/0178927 A1 | 8/2007 | Fernandez-Corbaton et al. | |
| 2008/0092075 A1 | 4/2008 | Jacob et al. | |
| 2008/0111491 A1* | 5/2008 | Spira | H05B 39/088 315/158 |
| 2008/0297323 A1 | 12/2008 | Barkan | |
| 2009/0121843 A1 | 5/2009 | Bauchot et al. | |
| 2009/0195360 A1* | 8/2009 | Jeon | H04B 5/0062 340/10.1 |
| 2009/0206983 A1 | 8/2009 | Knode et al. | |
| 2009/0231107 A1* | 9/2009 | Sato | H04W 52/36 340/10.3 |
| 2009/0273433 A1 | 11/2009 | Rigatti et al. | |
| 2009/0295545 A1* | 12/2009 | O'Haire | G06K 7/10198 340/10.5 |
| 2010/0036512 A1* | 2/2010 | Rutjes | H05B 47/19 709/224 |
| 2010/0045439 A1* | 2/2010 | Tak | G08C 21/00 340/10.1 |
| 2010/0052576 A1* | 3/2010 | Steiner | H05B 47/16 315/293 |
| 2010/0185339 A1* | 7/2010 | Huizenga | H05B 47/19 700/295 |
| 2010/0207548 A1 | 8/2010 | Iott | |
| 2010/0244746 A1 | 9/2010 | Van De Sluis et al. | |
| 2010/0273421 A1 | 10/2010 | Tu et al. | |
| 2011/0050421 A1* | 3/2011 | Duron | G01S 13/589 340/572.1 |
| 2011/0140832 A1 | 6/2011 | Vinkenvleugel et al. | |
| 2011/0140864 A1 | 6/2011 | Bucci | |
| 2011/0169606 A1 | 7/2011 | Brandsma | |
| 2011/0251807 A1 | 10/2011 | Rada et al. | |
| 2012/0047269 A1 | 2/2012 | Leonov et al. | |
| 2012/0055998 A1* | 3/2012 | Mieslinger | G06K 19/07749 235/492 |
| 2012/0056712 A1 | 3/2012 | Knode | |
| 2012/0131099 A1* | 5/2012 | Sorokin | G06F 16/58 709/203 |
| 2012/0140748 A1 | 6/2012 | Carruthers | |
| 2012/0286672 A1 | 11/2012 | Holland et al. | |
| 2013/0030589 A1 | 1/2013 | Pessina et al. | |
| 2013/0107042 A1 | 5/2013 | Forster et al. | |
| 2014/0052783 A1 | 2/2014 | Swatsky et al. | |
| 2014/0117871 A1 | 5/2014 | Swatsky et al. | |
| 2014/0265568 A1* | 9/2014 | Crafts | H05B 47/19 307/24 |
| 2014/0266765 A1 | 9/2014 | Neeley et al. | |
| 2014/0277805 A1 | 9/2014 | Browne, Jr. et al. | |
| 2015/0015377 A1 | 1/2015 | Bull et al. | |
| 2016/0192125 A1 | 6/2016 | Leland et al. | |

OTHER PUBLICATIONS

Lynn, Samara, "Wireless Witch: How to Place a Wireless Extender", Available at http://in.pcmag.com/networking/68806/feature/wireless-witch-hot-to-place-a-wireless-extender, Nov. 12, 2013, 11 pages.

* cited by examiner

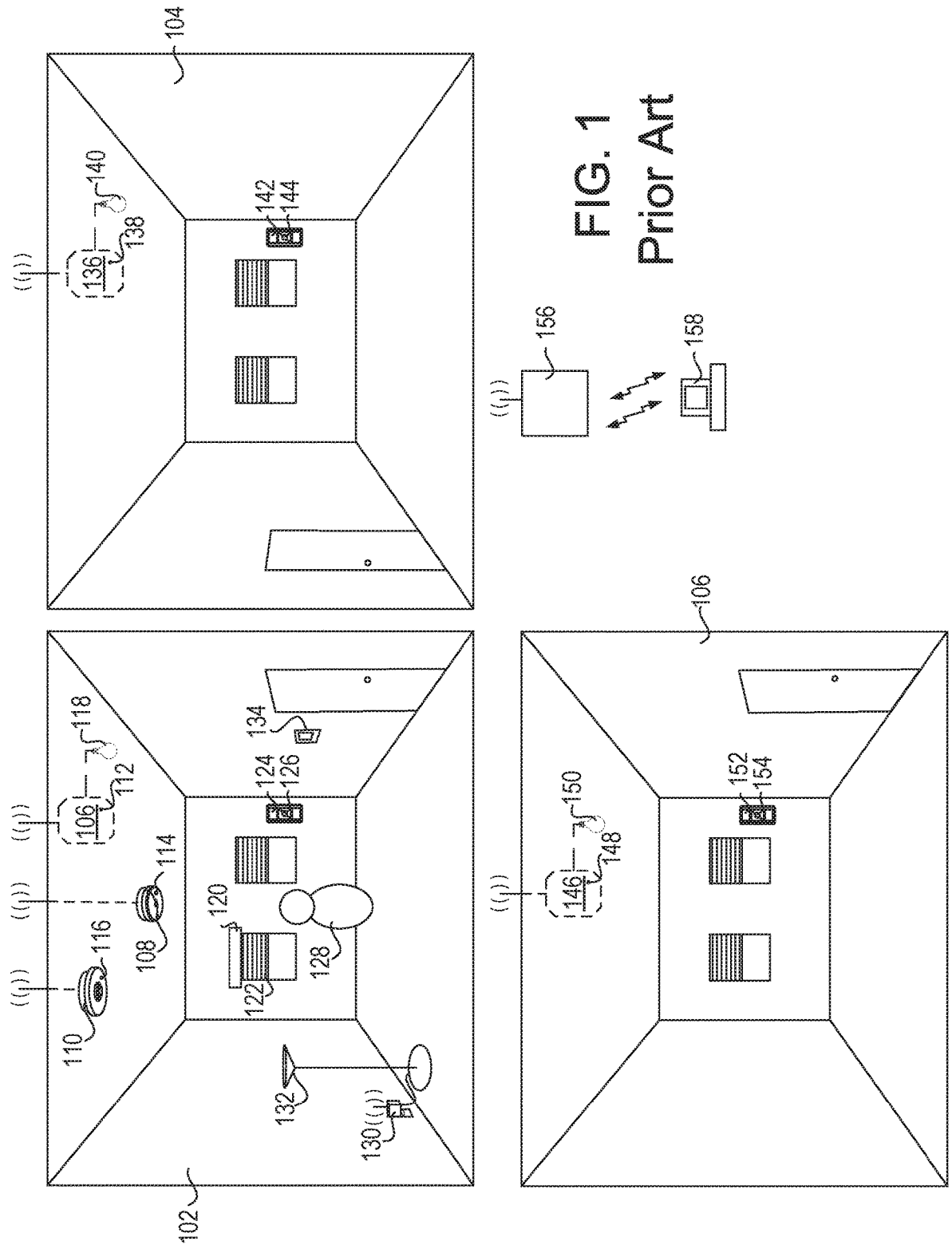

COMMISSIONING LOAD CONTROL SYSTEMS

CROSS-REFERENCE TO RELATED APPLICATIONS

This application is a continuation of U.S. patent application Ser. No. 16/864,788, filed May 1, 2020; which is a continuation of U.S. patent application Ser. No. 16/013,051, filed Jun. 20, 2018 (now U.S. Pat. No. 10,666,060, issued May 26, 2020); which is a continuation of U.S. patent application Ser. No. 13/830,237, filed Mar. 14, 2013 (now U.S. Pat. No. 10,027,127, issued on Jul. 17, 2018), the contents of all of which are hereby incorporated by reference herein in their entireties.

BACKGROUND

A user environment, such as a residence or an office building for example, may be configured using various types of load control systems. A lighting control system may be used to control the lighting loads in the user environment. A motorized window treatment control system may be used to control the natural light provided to the user environment. A heating, ventilation, and air-conditioning (HVAC) system may be used to control the temperature in the user environment. Each load control system may include various control devices, including control-source devices and control-target devices. The control-target devices may receive digital messages, which may include load control instructions, for controlling an electrical load from one or more of the control-source devices. The control-target devices may be capable of directly controlling an electrical load. The control-source devices may be capable of indirectly controlling the electrical load via the control-target device. Examples of control-target devices may include lighting control devices (e.g., a dimmer switch, an electronic switch, a ballast, or a light-emitting diode (LED) driver), a motorized window treatment, a temperature control device (e.g., a thermostat), an AC plug-in load control device, and/or the like. Examples of control-source devices may include remote control devices, occupancy sensors, daylight sensors, temperature sensors, and/or the like. To enable a control-target device to recognize instructions received from a control-source device, the control-target device and the control-source device may be associated with one another, such that the control-target device may recognize the digital messages received from the control-source device.

FIG. 1 depicts a prior art user environment in which control-source devices and control-target devices may be associated. As shown in FIG. 1, a user environment may include rooms 102, 104, and 106. Each of the rooms 102, 104, and 106 may include control-target devices that may be capable of directly controlling an electrical load. For example, rooms 102, 104, and 106 may include lighting control devices 106, 136, and 146 (e.g., ballasts, LED drivers, or dimmer switches) capable of directly controlling an amount of power provided to lighting loads 118, 140, and 150, respectively. Room 102 may include additional control-target devices, such as a motorized window treatment 120 for directly controlling the covering material 122 (e.g., via an electrical motor), an AC plug-in load control device 130 for directly controlling a plug-in electrical load (e.g., lamp 132 plugged into the device 130), and a temperature control device (e.g., thermostat 134) for directly controlling an HVAC system.

Rooms 102, 104, and 106 may also include control-source devices capable of indirectly controlling an electrical load by transmitting digital messages, which may include load control instructions, to a control-target device. The control-source devices in rooms 102, 104, and 106 may include remote control devices 124, 142, and 152 that may be mounted to the wall and that may send digital messages to the lighting control devices 106, 136, and 146, respectively. The lighting control devices 106, 136, and 146 may control an amount of power provided to the lighting loads 118, 140, and 150, respectively, based on the digital messages received from the remote control devices 124, 142, and 152. Room 102 may include additional control-source devices, such as an occupancy sensor 110 and a daylight sensor 108. The occupancy sensor 110 may send digital messages to a control-target device based on the detection of movement or occupancy within its observable area. The daylight sensor 108 may send digital messages to a control-target device based on the detection of natural light within its observable area.

As indicated above, each of the control-target devices may have to be associated with one or more control-source devices prior to being able to receive digital messages, which may include load control instructions, from the control-source devices for controlling a corresponding electrical load. The control-source devices and the control-target devices may be associated using a push-button association method 200, which is illustrated in the block diagram in FIG. 2A. As shown in FIG. 2A, the association method 200 may begin at 202 and a user 128 (shown in FIG. 1) may actuate a button on a control-target device at 204 to cause the control-target device to enter an association mode. For example, user 128 may actuate buttons 112, 138, and 148 on lighting control devices 106, 136, and 146, respectively, to put the lighting control devices 106, 136, and 146 into association mode. Once the control-target device is in association mode, a button may be actuated on a control-source device at 206 for associating the control-source device with the control-target device. For example, user 128 may actuate button 126 on remote control device 124 to associate the remote control device 124 with the lighting control device 106. The user 128 may actuate button 116 on occupancy sensor 110 and button 114 on daylight sensor 108 to also associate each device with the lighting control device 106. Buttons 144 and 154 may be actuated on remote control devices 142 and 152 to associate the remote control devices 142 and 152 with lighting control devices 136 and 146, respectively. The user 128 may also actuate a button on the AC plug-in load control device 130 or the temperature control device (e.g., thermostat 134) to associate these control-target devices with a control-source device. After the control-source device is associated with the control-target device at 206, the control-target device may recognize digital messages, which may include load control instructions, from a control-source device and the user 128 may use the control-source device for instructing an associated control-target device to control an amount of power provided to an electrical load at 208. The association method 200 may end at 210.

FIG. 2B shows another prior art association method 220 for associating control-source devices and control-target devices. As shown in FIG. 2B, the association method 220 may start at 222. At 224, each of the control-source devices and control-target devices in the load control system may be identified by user 128. The user 128 may enter each association between a control-target device and a control-target device into a computer, such as computer 158 (shown in FIG. 1), at 226. At 228, each of the control-target devices may be programmed by the user 128, via computer 158, to be capable of recognizing digital messages, which may include load control instructions, from associated control-source devices. For example, the computer 158 may send a serial number of an associated control-source device to the control-target device so that the control-target device may identify digital messages from the control-source device. The computer 158 may program the control-target device via a load control device controller 156, for example. Once the control-target device is programmed at 228, the control-target device may recognize digital messages from a control-source device and the user 128 may use the control-source device for instructing an associated control-target device to control an amount of power provided to an electrical load at 230. The association method 220 may end at 232.

The association methods 200 and 220 require knowledge of each of the load control devices being associated in a system. Additionally, association method 200 requires physically actuating buttons on each control-source device and each control-target device for performing association. Accordingly, current association methods may be time consuming and inconvenient.

Current associations may also be difficult to reconfigure once they have been established. For example, in order to remove an association between a control-source device and a control-target device, each control-target device may be put into a default mode which may cause the control-target device to remove each association stored in the control-target device. This may cause a user to re-establish each association between a control-source device and a control-target device when a single association is reconfigured or removed.

SUMMARY

A load control system may include load control devices for controlling an amount of power provided to an electrical load. The load control devices may include a control-source device and a control-target device. The control-target device may be capable of controlling the amount of power provided to the electrical load based on digital messages received from the control-source device. The digital messages may include load control instructions or another indication that causes the control-target device to determine load control instructions for controlling an electrical load.

The load control system may include a user device for discovering load control devices when the load control devices are within an established range associated with the user device. The user device may discover the control-target devices and/or control-source devices. The user device may discover the load control devices by broadcasting a discovery message within the established range and receiving a response to the discovery message from the load control devices within the established range. The discovery message may include an indication of a device type that may respond to the discovery message. The range in which the discovery message may be sent may be established based on a transmit power of the user device. The established range may be adjusted as the transmit power of the user device is adjusted. The established range may be determined by disregarding any information received from a load control device outside of the established range.

The user device may be used to associate the control-source device with the control-target device. The association may enable the control-target device to recognize digital messages from an associated control-source device and/or control the amount of power provided to the electrical load based on the digital messages received from the control-source device. The association may be performed and/or stored at the user device. The user device may associate the control-source device with the control-target device by sending the association information or a control-source device identifier to the control-target device to enable the control-target device to recognize and/or execute digital messages from an associated control-source device. The user device may disassociate each control-source device from a control-target device by instructing the control-target device to remove an identifier of the control-source device from storage.

Communications between the user device and the load control devices may be performed via a wireless communications module. The wireless communications module may be capable of communicating with the user device via a communications channel and with the load control devices via another communications channel. The established range for discovering and/or associating load control devices may correspond to the transmit power of the wireless communications module. The wireless communications module may adjust a transmit power to discover the load control devices within the established range.

BRIEF DESCRIPTION OF THE DRAWINGS

FIG. 1 depicts an example prior art environment for associating load control devices.

DETAILED DESCRIPTION

Figure 2A:
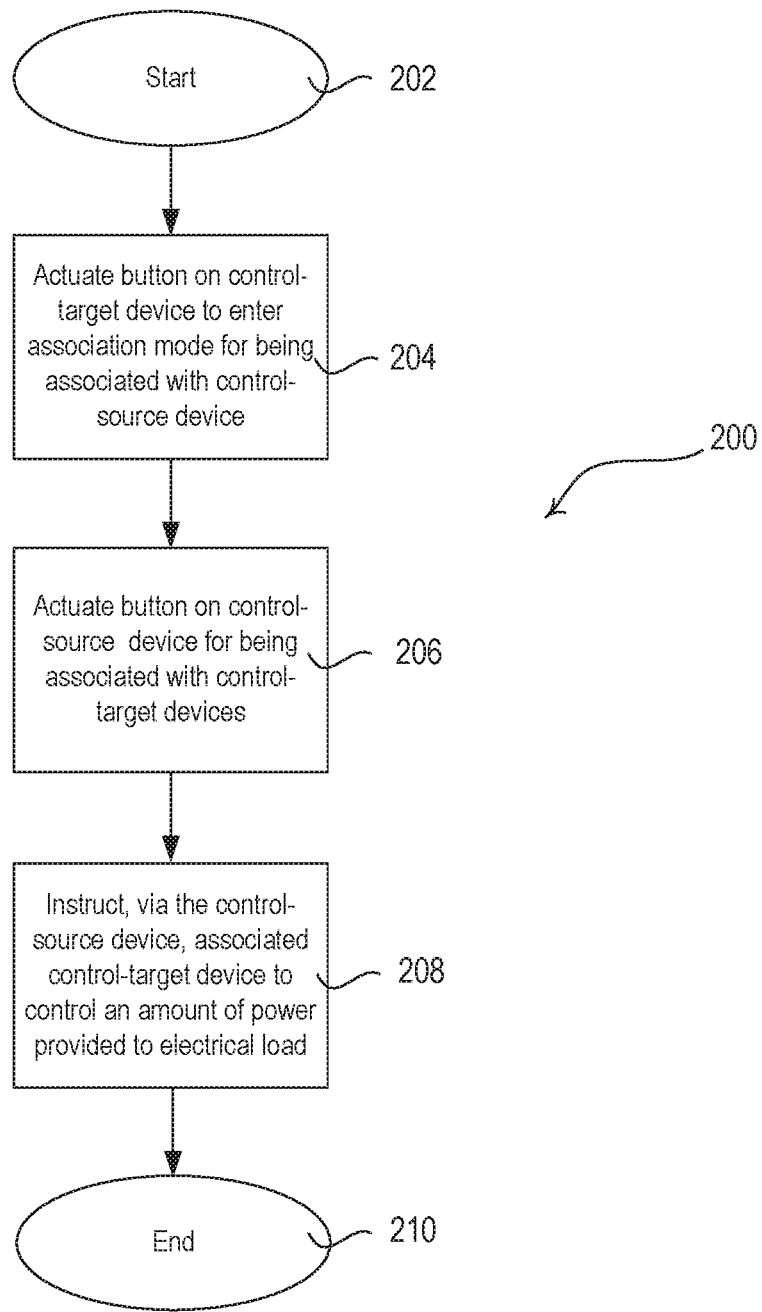
FIGS. 2A and 2B are simplified flow diagrams of example prior art processes for associating load control devices.
Figure 2B:
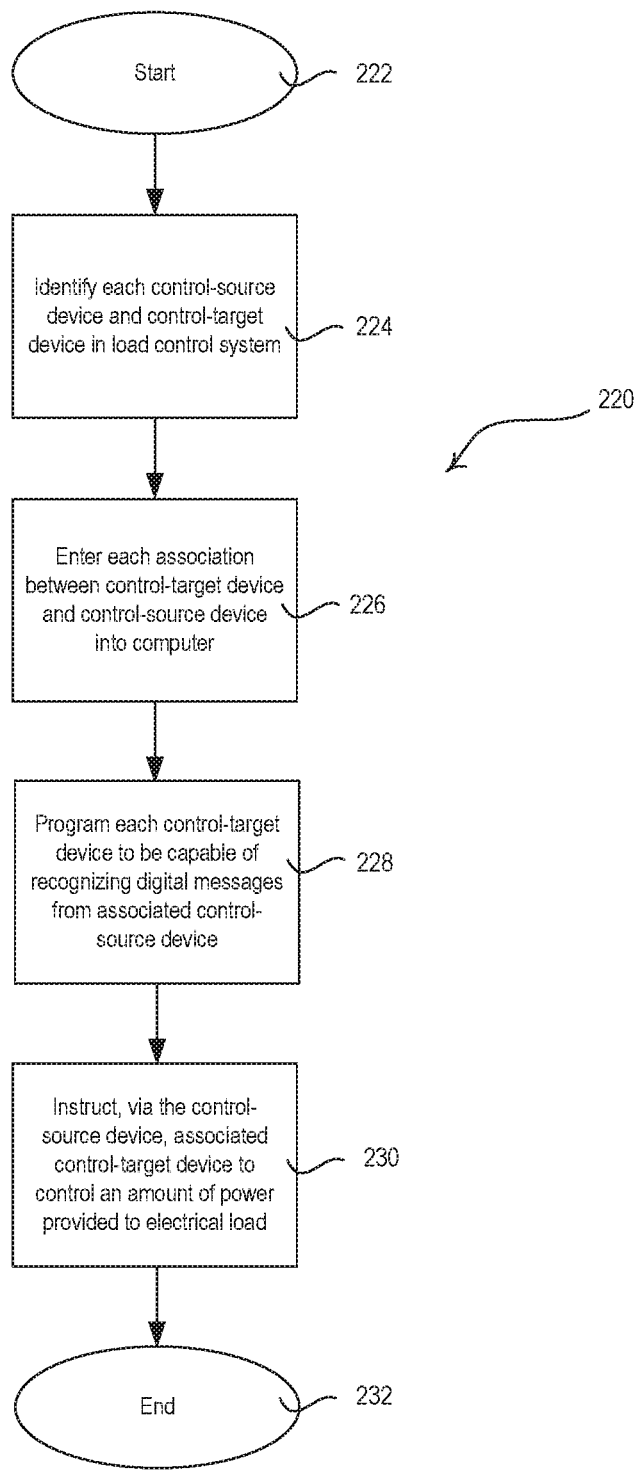
Figure 3A:
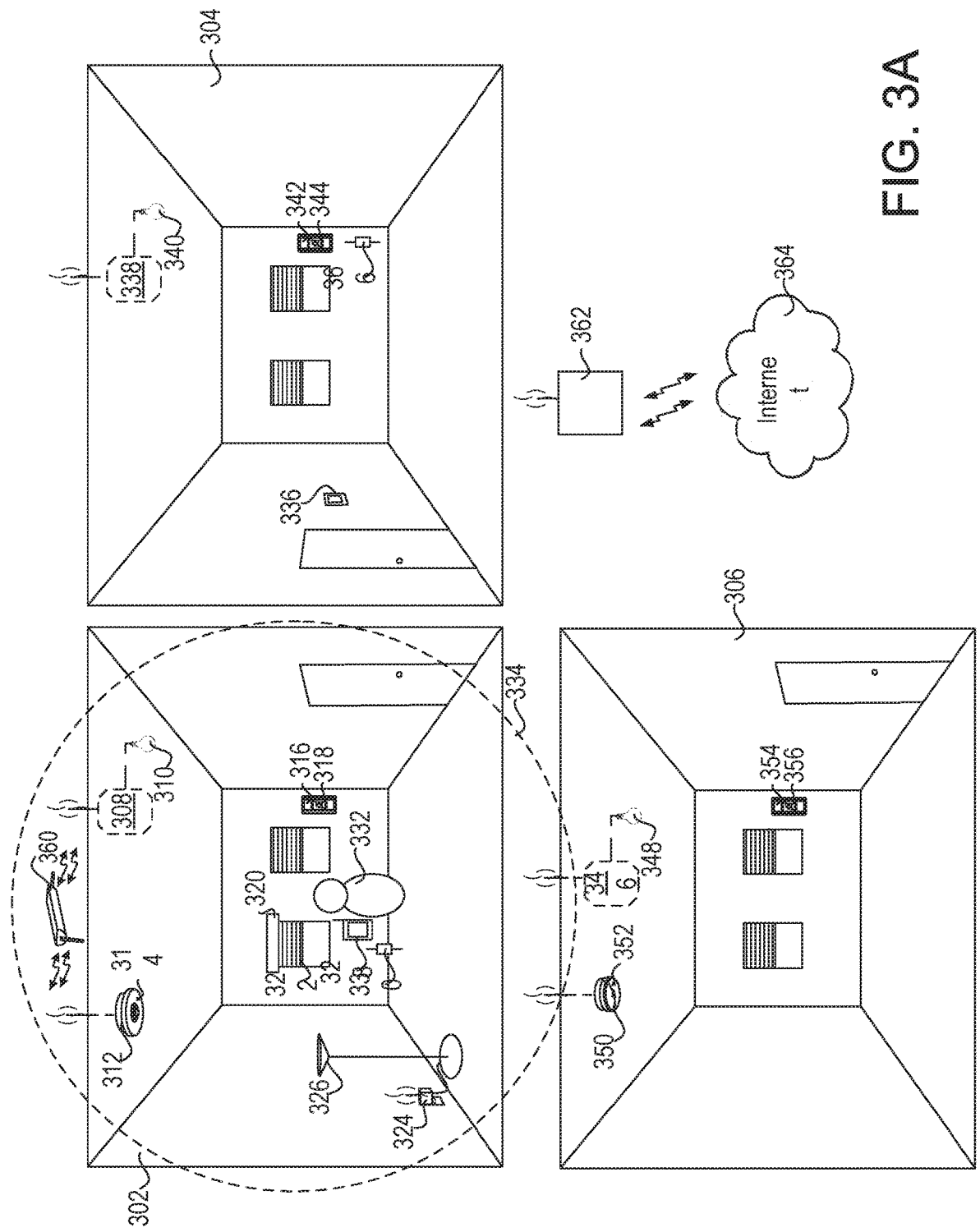
FIGS. 3A and 3B are perspective views of example environments for associating load control devices.

FIG. 3A depicts a representative environment for associating control devices, which may include control-source devices and control-target devices. When a control-target device is associated with a control-source device, the control target device may be responsive to the control-source device. A control device may be both a control-target and a control-source device. As shown in FIG. 3A, rooms 302, 304, and 306 may be installed with one or more control-target devices, e.g., load control devices for controlling the electrical loads within a room or building. Each load control device may be capable of directly controlling the amount of power provided to an electrical load and may be controlled by a control-source device. Example control-target devices may include lighting control devices 308, 338, and 346 (e.g., ballasts, LED drivers, or dimmer switches) for controlling the amount of power provided to lighting loads 310, 340, and 348, respectively, a motorized window treatment 320 having a motor drive unit (e.g., including a motor) for controlling the position of covering material 322, a temperature control device (e.g., thermostat 336) for controlling an HVAC system, and/or an AC plug-in load control device 324 for controlling a plug-in electrical load, such as a floor lamp 326, a table lamp or another electrical device that is plugged in to the AC plug-in load control device 324.

A control-source device may indirectly control the amount of power provided to an electrical load by transmitting digital messages to the control-target device. The digital messages may include control instructions (e.g., load control instructions) or another indication that causes the control-target device to determine load control instructions for controlling an electrical load. Example control-source devices may include a user device 328, remote control devices 316, 342, and 354, an occupancy sensor 312, and/or a daylight sensor 350. The user device 328 may include a wired or wireless device. Examples of the user device 328 may include a wireless phone, a tablet, a laptop, a personal digital assistant (PDA), or the like. The control-source devices may also include a load control device, such as a dimmer switch, an electronic switch, or the like. The remote control devices 316, 342, and 354 may be wireless devices capable of controlling a control-target device via wireless communications. The remote control devices 316, 342, and 354 may be attached to the wall or detached from the wall.

The control-target devices and the control-source devices may be associated to enable communication of digital messages for controlling an electrical load. The user device 328 may be used to associate control-source devices and control-target devices to enable communication of the digital messages. To associate the control-source devices and the control-target devices, the user device 328 may discover one or more control-target devices within its area. The user device 328 may establish a range 334 in which it may perform discovery. The user device 328 may send a discovery message, such as a broadcast message for example, within the established range 334. The user device 328 may receive a response to the discovery message from the control-target devices capable of performing two-way communications and may associate the discovered devices with a control-source device.

As shown in FIG. 3A, the user device 328 may send a discovery message within range 334 that may be received by control-target devices, such as the lighting control device 308, the motorized window treatment 320, and/or the AC plug-in load control device 324. The discovery message may be received by control-source devices, such as remote control device 316 and/or the occupancy sensor 312. The discovery message may be a broadcast message that may be broadcast within the established range 334. The lighting control device 308, the motorized window treatment 320, the AC plug-in load control device 324, the remote control device 316, and/or the occupancy sensor 312 may be two-way communication devices that may receive the discovery message and may respond to the discovery message by sending a response message. The response message my include information identifying the load control device from which the response message was transmitted. The response message may indicate the type of device responding, an identifier (e.g., serial number) that may indicate the device type, the link address for communicating with the device directly, whether the device is a control-target device or a control-source device, and/or other information about the device.

The remote control device 316 and/or the occupancy sensor 312 may be one-way communication devices (e.g., transmit-only communication device) that may be unable to receive the discovery message from the user device 328. To discover the remote control device 316, the user 332 may actuate a button 318 on the remote control device 316 that may cause the remote control device 316 to send discovery information to the user device 328. To trigger the transmission of discovery information at the occupancy sensor 312, the user 332 may actuate a button 314 on the occupancy sensor 312. The occupancy sensor 312 may be equipped with a sensor that may identify a laser signal transmitted from a laser (not shown) held by the user 332. The detection of the laser signal by the sensor may trigger the transmission of the discovery information. The discovery information may indicate similar information as indicated by the response message, such as the device type, the link address, the device identifier (e.g., serial number), whether the device is a control-target device or a control-source device, and/or other information about the device, for example.

The user device 328 may communicate with the load control devices via one or more communications modules, such as communications module 330. The communications module 330 may be included in the user device 328 or may be external to the user device 328 and the load control devices, as shown in FIG. 3. The user device 328 may perform wired or wireless communications with communications module 330. The communications module 330 may communicate with load control devices via wireless communications. Example wireless communications channels may include WI-FI®, ZIGBEE, BLUETOOTH®, a proprietary communication protocol, such as CLEAR CONNECT™, near field communication (NFC), or the like. The communications module 330 may communicate with the user device 328 and one or more load control devices via different communications channels. For example, the communications module 330 may perform communications with the user device 328 via BLUETOOTH® and may communicate with one or more load control devices via WI-FI® or a proprietary communication protocol, such as CLEAR CONNECT™.

The user device 328 may communicate with a central processing device (not shown), such as a server for example, via the Internet 364. The user device 328 may send association information to and/or receive association information from the central processing device. The user device 328 may receive firmware or other updates from the central processing device. The user device 328 may receive firmware updates for the load control devices and send the firmware updates to the load control devices.

Multiple communications modules, such as communications modules 330, 366, may be used for communicating with the load control devices. The communications modules may be installed throughout the rooms 302, 304, and/or 306.

The user device 328 may discover and/or perform association with the communications modules 328, 366. The user device 328 may send a broadcast message to discover communications modules 328, 366. An identifier of the communications modules 328, 366 may be stored at the user device 328 for detecting communications from the communications modules 328, 366. An identifier of the user device 328 may be stored at the communications modules 328, 366 for detecting communications from the user device 328.

The user device 328 may discover and/or associate the load control devices within the established range of each communications module. For example, the user device 328 may be associated with the communications module 330 and use communications module 330 to discover and/or associate load control devices in room 302. The load control devices in room 304 may be outside of the established range 334. The user device 328 may be associated with the communications module 366 and may use the communications module 366 to discover and/or associate the load control devices in room 304.

The communications modules 330, 366 may be used at the same time to send information to and/or receive information from one or more load control devices. For example, the communications module 330 may be used to send association information to one or more load control devices in the established range 334, while the communications module 366 is sending association information or firmware updates to one or more load control devices within its established range.

The load control devices discovered within the established range 334 may be associated with one another for enabling communication of load control information between the load control devices. The user device 328 may be used to associate a discovered control-source device, such as the remote control device 316, with a discovered control-target device, such as the lighting control device 308, for enabling digital messages to be sent from the control-source device to the control-target device. The user device 328 may store the association between the control-source device and the control-target device. The association information may be stored locally and/or transmitted, e.g., via the Internet 364, to a central processing device for storage. The stored associations may be used for configuring the lighting loads in rooms 302, 304, and/or 306 from which the associations were created. The stored associations may also be used for configuring the loads in other rooms or lighting system in another location, which may have the same or similar load control device configuration as in rooms 302, 304, and/or 306. For example, the stored associations for room 302 may be used as a template for other rooms that have a similar load control device configuration as room 302. The user device 328 may discover a similar configuration to room 302 in another room or location and may perform the same associations between device types as were performed in room 302.

The user device 328 may transmit association information to the control-target device to enable the control-target device to recognize digital messages received from the load control device. The association may enable the control-target device to execute load control instructions received in the digital messages or otherwise determined from an indication in the digital messages. The user device 328 may send an identifier of the control-source device to the control-target devices to which the control-source device is associated for storing at the control-target device. The control-target devices may obtain the association information from other devices in the load control system, such as by retrieving the identifier of the control-source device from a central processing device for example. Each control-target device may store the identifier of the associated control-source device so that the control-target device may recognize digital messages received from the associated control-source device.

Figure 3B:
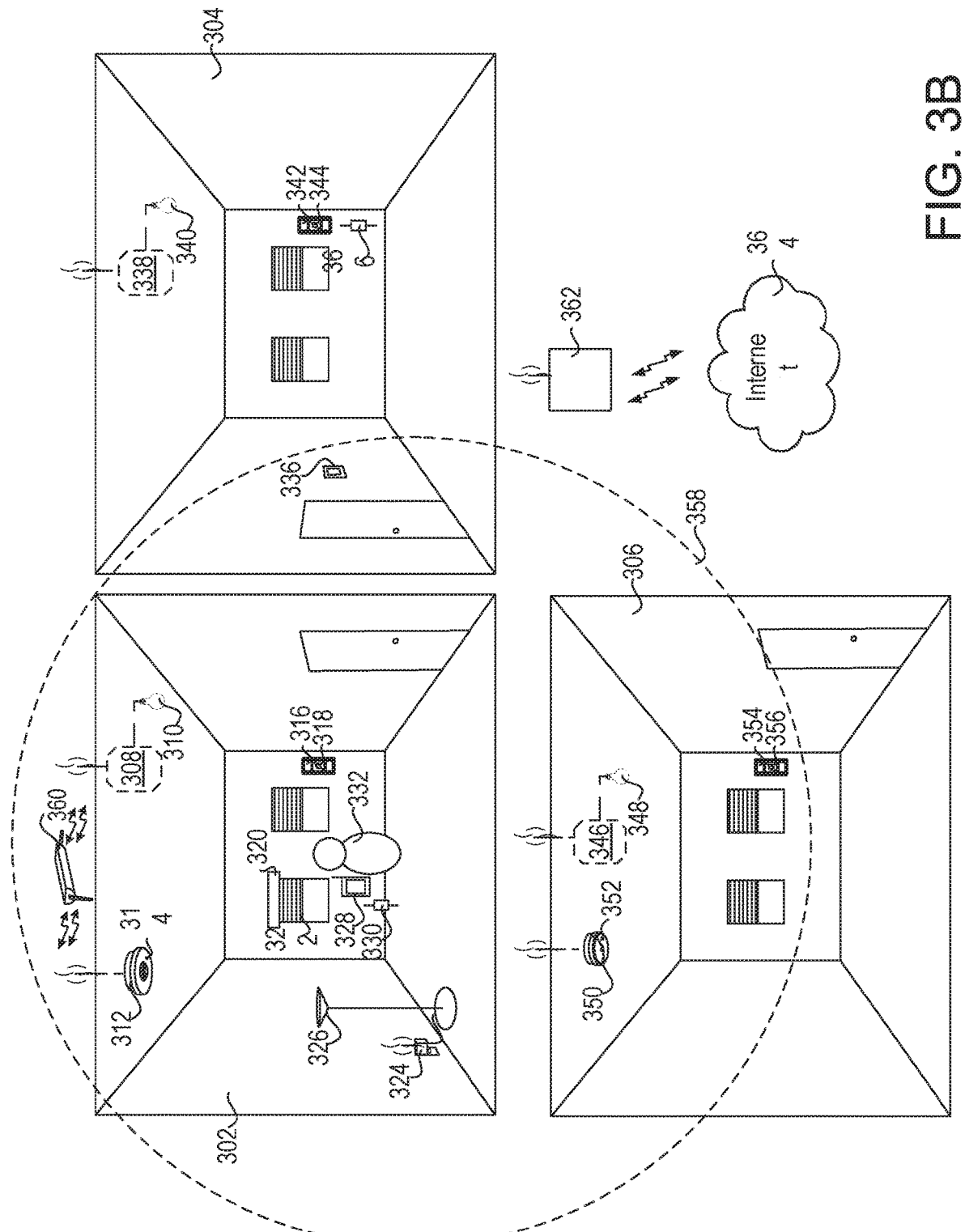

As the load control devices in room 304 and room 306 are outside of the established range 334, these load control devices may not receive a discovery message from the user device 328. As shown in FIG. 3B, the established range 334 may be configurable. For example, the range 334 may be adjusted to the larger range 358. Using the established larger range 358, the user device may discover and/or associate temperature control device 336, lighting control device 346, daylight sensor 350, and/or remote control device 354. Though not shown in FIG. 3B, the established range 334 may also be adjusted to a smaller range, which may include less load control devices. The user 332 may adjust the range 334 or move the range 334 to another location depending on the size of the room or the location of various load control devices to discover the load control devices within a certain area. The user 332 may also use another communications module, such as communications module 366, to discover and/or associate the load control devices outside of the established range 334.

The user device 328 may discover the temperature control device 336, lighting control device 346, daylight sensor 350, and/or remote control device 354 by sending a discovery message within the established range 358. The remote control device 354 and/or the daylight sensor 350 may be one-way communication devices that may be unable to receive the discovery message from the user device 328. To discover the remote control device 354, the user 332 may actuate button 356 to cause the remote control device 354 to send discovery information to the user device 328. To trigger the transmission of discovery information at the daylight sensor 350, the user 332 may actuate button 352 on the daylight sensor 350 or transmit a laser signal identifiable by the daylight sensor 350.

The lighting control device 338 and the remote control device 342 may be outside of the established range 358 and may not receive discovery messages transmitted within the established range 358. The lighting control device 338 and the remote control device 342 may transmit discovery information to the user device 328, as the lighting control device 338 and the remote control device 342 may have a greater transmission range than the range 358. To transmit the discovery information from the remote control device 342, a user may actuate the button 344. To transmit discovery information from the lighting control device 338, a user may actuate a button on the lighting control device 338 (not shown). The communications module 366 may also be used to communicate discovery information from the lighting control device 338 and the remote control device 342, such as where the lighting control device 338 and the remote control device 342 are within the established range of the communications module 366. The communications module 366 may transmit information to the user device 328 when the user device 328 is within the established range of the communications module 366.

The user device 328 may discover existing associations. The user device 328 may receive association information from a central processing device, via the Internet 364, a broadcast controller 360 or other device that may be in communication with one or more load control devices, or from the load control devices themselves. The user device 328 may send a request for the association information. For example, the user device 328 may send a request to a control-target device requesting one or more of the control-source devices to which the control-target device is associated. The user device 328 may make a request for a specific control-source device identifier to determine whether a control-target device is associated with a specific control-source device.

Once a control-source device is associated with a control-target device, the control-source device may send digital messages to the control-target device to cause the control-target device to control an amount of power provided to an electric load. For example, the associated remote control device 316 may instruct the lighting control device 308 to increase or decrease the lighting level of the lighting load 310, instruct the motorized window treatment 320 to raise or lower the covering material 322, instruct the AC plug-in load control device 324 to raise or lower the lighting level of the floor lamp 326, and/or instruct the temperature control device 336 to raise or lower the temperature in one or more rooms. The associated occupancy sensor 312 may send similar instructions to a control-target device based on the detection of movement or occupancy within the room 302. The daylight sensor 350 may send similar digital messages to a control-target device based on the detection of natural light within the room 306. The user device 328 may be used to send the digital messages between the control-source device and the control-target device, or the digital messages may be sent independent of the user device 328 (e.g., via direct communications between the control-source device and the control-target device).

The user device 328 and/or communications module 330 may communicate with the load control devices via one or more intermediary devices. For example, the user device 328 and/or communications module 330 may communicate with the lighting control devices 308, 338, and/or 346 via a lighting control device controller 362 (e.g., a ballast controller). The lighting control device controller 362 may wirelessly communicate with the user device 328 and/or communications module 330. The lighting control device controller 362 may communicate with the lighting control devices 308, 338, and/or 346 via a wired or wireless communication.

The user device 328 and/or communications module 330 may communicate with the load control devices via a broadcast controller 360. The broadcast controller 360 may include a wireless communication device capable of broadcasting information to and/or receiving information from one or more load control devices within the wireless range of the broadcast controller 360. The broadcast controller 360 may include a wireless communication device capable of sending information to and/or receiving information from the user device 328 and/or communications module 330 when the user device 328 and/or communications module 330 are within its wireless range. The user device 328 may send information to the broadcast controller 360 for configuring the broadcast controller 360 (e.g., configuring one or more groups of load control devices with which the broadcast controller 360 may perform communications, synchronizing the time on the broadcast controller 360, etc.). As the user device 328 may send information to and receive information from the broadcast controller 360, the broadcast controller 360 may be configured and/or may communicate with load control devices via the user device 328 and/or communications module 330 without having an independent connection to the Internet 364. The broadcast controller 360 is described in greater detail in commonly-assigned U.S. Non-Provisional patent application Ser. No. 13/725,105, filed Dec. 21, 2012, entitled LOAD CONTROL SYSTEM HAVING INDEPENDENTLY-CONTROLLED UNITS RESPONSIVE TO A BROADCAST CONTROLLER, the entire disclosure of which is hereby incorporated by reference.

The user device 328 may discover and/or perform association with the broadcast controller 360. The user device 328 may send a broadcast message to discover broadcast controller devices within the established range 334, 358. An identifier of the broadcast controller 360 may be stored at the user device 328 for detecting communications from the broadcast controller 360. An identifier of the user device 328 may be stored at the broadcast controller 360 for detecting communications from the user device 328. The user device 328 may discover load control devices and the broadcast controller 360 at the same time.

The user device 328 and/or communications module 330 may discover load control devices within the established range 334, 358 and transmit an indication of the discovered devices to the broadcast controller 360 for performing association and/or sending instructions to the load control devices. The broadcast controller 360 may determine whether a discovered load control device is within range of the broadcast controller 360 by attempting to associate the discovered load control device with another load control device. If association fails, then the discovered device may be out of the wireless range of the broadcast controller 360. If association succeeds, the broadcast controller 360 may receive a response message from the associated device and the broadcast controller 360 may know that the discovered device is within its wireless range and is associated. In another example, the user device 328 may perform the association of load control devices and send the association information to the broadcast controller 360 for controlling the associated load control devices.

The broadcast controller 360 may control one or more load control devices within a broadcast control group. A broadcast control group may include one or more load control devices of an identified device type, within a defined location, or that share another group characteristic. The load control devices in a broadcast control group may be controlled at the same time by the broadcast controller 360. The load control devices that are included in a broadcast control group may receive a group identifier and store the group identifier such that they may respond to digital messages that are sent to the group and include the group identifier. For example, the broadcast controller 360 may create a lighting control device group that includes lighting control devices 308, 338, and 346. The broadcast controller 360 may instruct the lighting control devices 308, 338, and 346 in the lighting control device group to turn on or off.

The user device 328 may be used to configure the broadcast control groups. The user device 328 may receive discovery information from the load control devices within the established range 334, 358 and may use the discovery information to configure a broadcast control group. For example, the user device 328 may configure groups of devices having the same device type. The broadcast control groups may also be configured based on association information. For example, the group of load control devices associated with the remote control device 316 may be included in a broadcast control group. The broadcast control groups may be sent to the broadcast controller 360 for sending digital messages (e.g., directly or via the user device 328 and/or communications module 330) to the load control devices in the group.

While FIGS. 3A and 3B illustrate a single user device 328, multiple user devices may be implemented to perform discovery and/or association of load control devices. Each of the user devices may be used by a different user. The user devices may be in communication with one another (e.g., directly or via the Internet 364) to provide updated association information in real-time. The user device 328 may display the association information received from one or more other devices. The user device 328 may discover when the established range 334, 358 overlaps with the established range of another user device and may indicate the overlap to the user 332. The indication may be provided such that the user 332 may move to another location or adjust the established range 334, 358 to avoid discovering and/or associating devices in the same area as another user.

Figure 4:
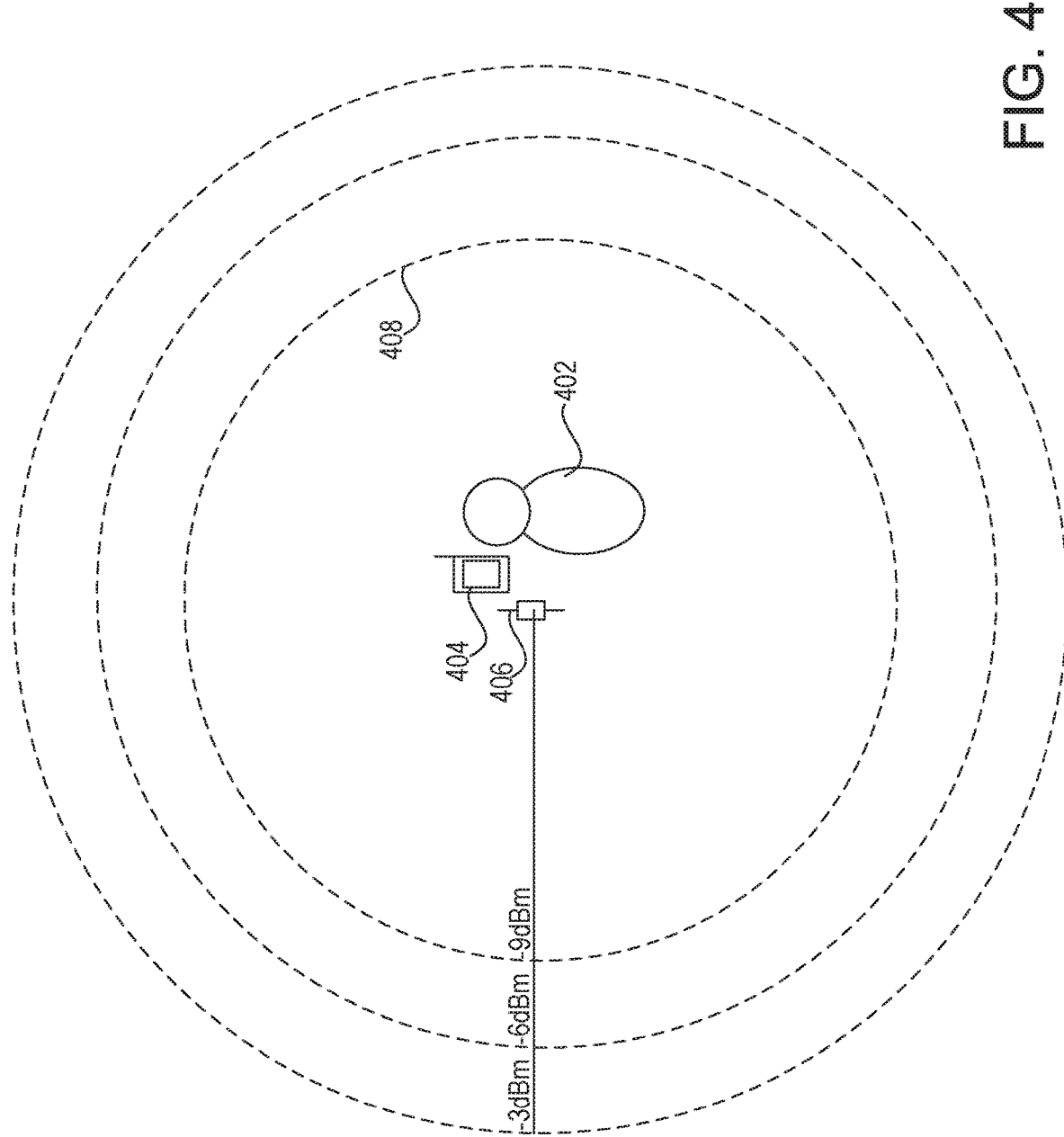
FIG. 4 is a diagram depicting example ranges for performing discovery and/or association of load control devices.

FIG. 4 is a diagram depicting example ranges for performing discovery and/or association of load control devices. As shown in FIG. 4, the established range 408 may be adjustable. A user 402 may increase or decrease the established range 408 (e.g., between −3 dBm and −9 dBm) to discover and/or associate load control devices within a larger or smaller area. The established range 408 may be measured from the communications module 406, the user device 404, or the user 402. For example, the established range 408 may be determined based on the distance the communications module 406 and/or the user device 404 are configured to transmit and/or receive information. The established range 408 may be determined by adding to or subtracting from the distance that the communications module 406 and/or the user device 404 are configured to transmit and/or receive information. To determine the established range 408 from the user 402, the distance between the user 402 and the user device 404 and/or the distance between the user 402 and the communications module 406 may be calculated. The distance from the user 402 may be added to or subtracted from the distance that the communications module 406 and/or the user device 404 are configured to transmit. To determine the established range 408 from the user device 404, the distance between the user device 404 and the communications module 406 may be added to or subtracted from the distance that the communications module 406 is configured to transmit.

The range 408 may be established by adjusting the signal strength of the signal transmitted by the communications module 406 or the user device 404. For example, the signal strength may be increased or decreased between −9 dBm and −3 dBm. The user device 404 may broadcast discovery messages to and receive response messages from load control devices within the established range 408. The user device 404 may determine the load control devices within the established range based on the response messages received from load control devices.

The user device 404 may establish the range 408 by disregarding information received from load control devices outside of the range 408. For example, the communications module 406 or user device 404 may have a static signal strength of −3 dBm and the established range 408 may be −9 dBm. In this case, the user device 404 may broadcast a discovery message to and receive response messages from load control devices within the −3 dBm area. The user device 404 may determine the distance of each load control device based on the received signal strength of response messages from the load control device. When the received signal strength of a load control device is below a threshold, the user device 404 may determine that the load control device is outside of the established range 408 (e.g., between −9 dBm and −3 dBm) and may disregard any information received from the load control device.

Figure 5:
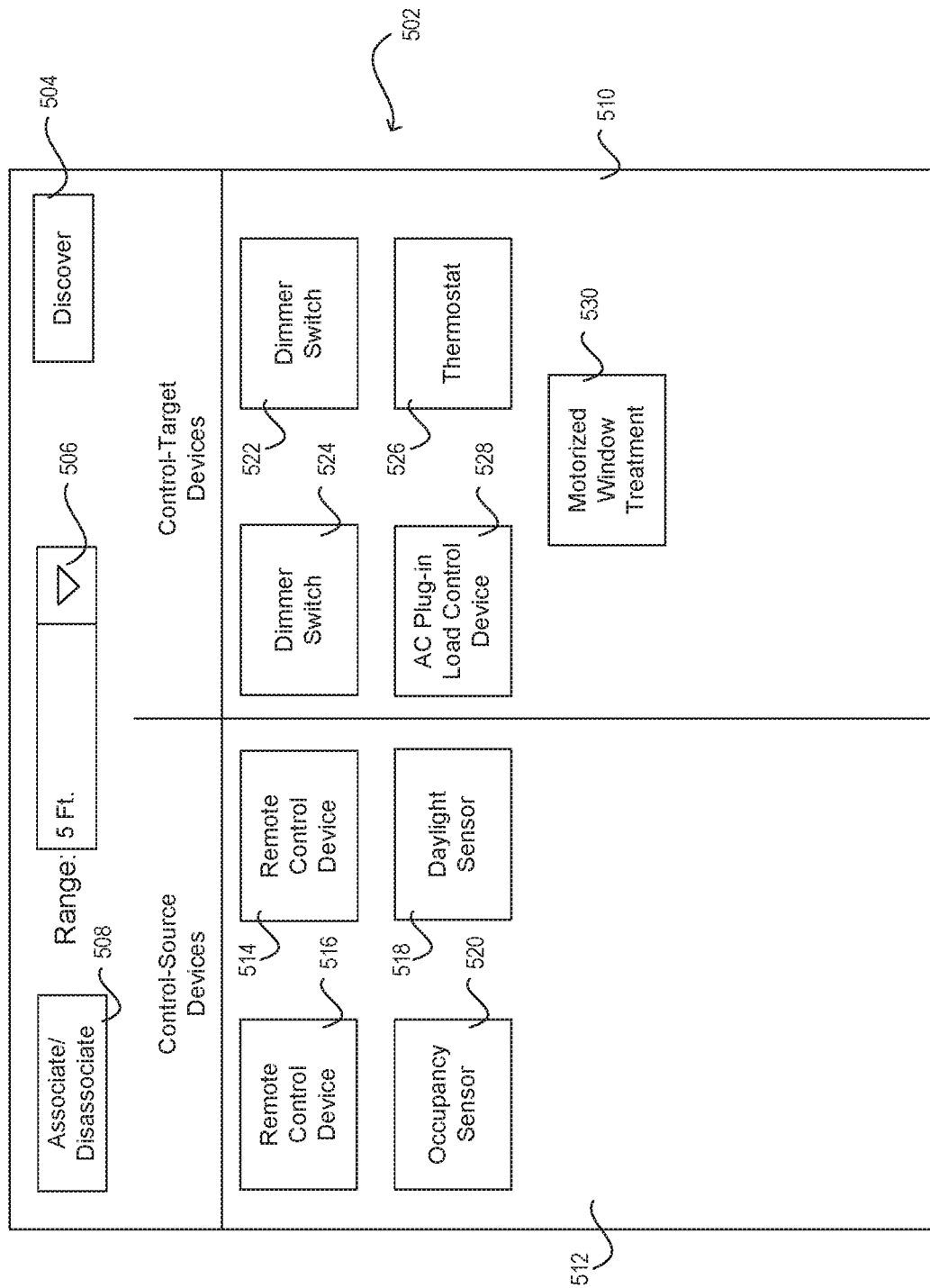
FIG. 5 depicts an example graphical user interface (GUI) that may be used for discovering and configuring load control devices.

FIG. 5 depicts an example graphical user interface (GUI) 502 that may be used for discovering and/or identifying load control devices. The discovery/association range 506 may be established using a dropdown box or other button (not shown) on the GUI 502. The established range 506 may be configurable based on the transmit power of the communications module. For example, if the communications module is capable of transmitting and/or receiving transmissions up to a distance of twenty feet, the discovery/association range 506 may be established incrementally between zero and twenty feet.

The discovery button 504 may be selected for discovering load control devices within the established range 506. Upon selection of the discovery button 504, the user device may perform discovery of the load control devices within the established range 506. The discovered devices within the established range 506 may be displayed for user selection, configuration, and/or association. The discovered devices may be displayed to indicate the device type and/or whether the device is a control-target device 510 or a control-source device 512. As shown in FIG. 5, the discovered devices may include remote control device 514, remote control device 516, daylight sensor 518, occupancy sensor 520, dimmer switch 522, dimmer switch 524, thermostat 526, AC plug-in load control device 528, and/or motorized window treatment 530. The GUI 502 may display the discovered load control devices as control-source devices 512 and control-target devices 510.

The discovered load control devices may be identified for configuration and/or association. For example, upon selection of a control-target device 510 and/or an identification button (not shown) on the GUI 502, the user device may transmit an identification message to the selected control-target device 510 instructing the control-target device 510 to identify itself to the user. The control-target devices 510 may identify themselves visually or audibly. The dimmer switch 522 and dimmer switch 524 may identify themselves by flashing a corresponding lighting fixture. The AC plug-in load control device 528 may identify itself via a display, an indicator light, or a device that is plugged into the AC plug-in load control device 528. For example, the AC plug-in load control device 528 may flash a lighting fixture of a lamp plugged into the AC plug-in load control device 528, flash an indicator light on a device plugged into the AC plug-in load control device 528, or the like. The thermostat 526 may identify itself by flashing an indicator light, providing a message on the thermostat 526 display, and/or providing an identification via the HVAC system controlled by the thermostat 526. The thermostat 526 may provide an indication via the HVAC system by turning the HVAC system on or off, increasing or decreasing the temperature of the HVAC system, or the like. The motorized window treatment 530 may identify itself by moving the corresponding covering material that it controls. For example, the motorized window treatment 530 may jog the covering material up and down a predefined distance, wiggle the covering material, or tilt the covering material.

The discovered control-source devices 512 may be identified for configuration and/or association. If the control-source devices 512 are capable of receiving an identification message, the control-source devices 512 may identify themselves by responding to the identification message. For example, upon selection of a control-source device 512 and/or an identification button (not shown) on the GUI 502, the user device may transmit an identification message to the selected control-source device 512 instructing the control-source device 512 to identify itself to the user. The control-source devices 512 may identify themselves visually or audibly. For example, the remote control device 514, the remote control device 516, the daylight sensor 518, and/or the occupancy sensor 520 may identify themselves by flashing a respective indicator light located on each device.

One or more fields associated with the discovered load control devices may be configured. For example, a load control device may be renamed. Control-source devices 512, such as remote control device 514 and/or remote control device 516, may be renamed for better identification or distinction. Similarly, control-target devices 510, such as dimmer switch 522 and/or dimmer switch 524, may be renamed for better identification or distinction. Each load control device may be selected to configure other fields associated therewith, such as the device type, the link address for communicating with the device, whether the device is a control-target device or a control-source device, and/or other information about the device.

The GUI 502 may be used to create a common interface across load control systems and/or load control devices. The GUI 502 may display control-source devices 512 and/or control-target devices 510 based on the one or more parameters associated with the devices. The GUI 502 may display control-source devices 512 and/or control-target devices 510 based on the location of the devices. For example, the GUI 502 may display control-source devices 512 and/or control-target devices 510 for a room or a subset of rooms, a floor or a subset of floors, a zone or subset of zones, or the like. The GUI 502 may display control-source devices 512 and/or control-target devices 510 based on a device type. For example, the GUI 502 may display the control target devices 510 or the control-source devices 512 independently. The GUI 502 may display the lighting control devices, motorized window treatment, thermostats, AC plug-in load control devices, etc., independently.

Figure 6:
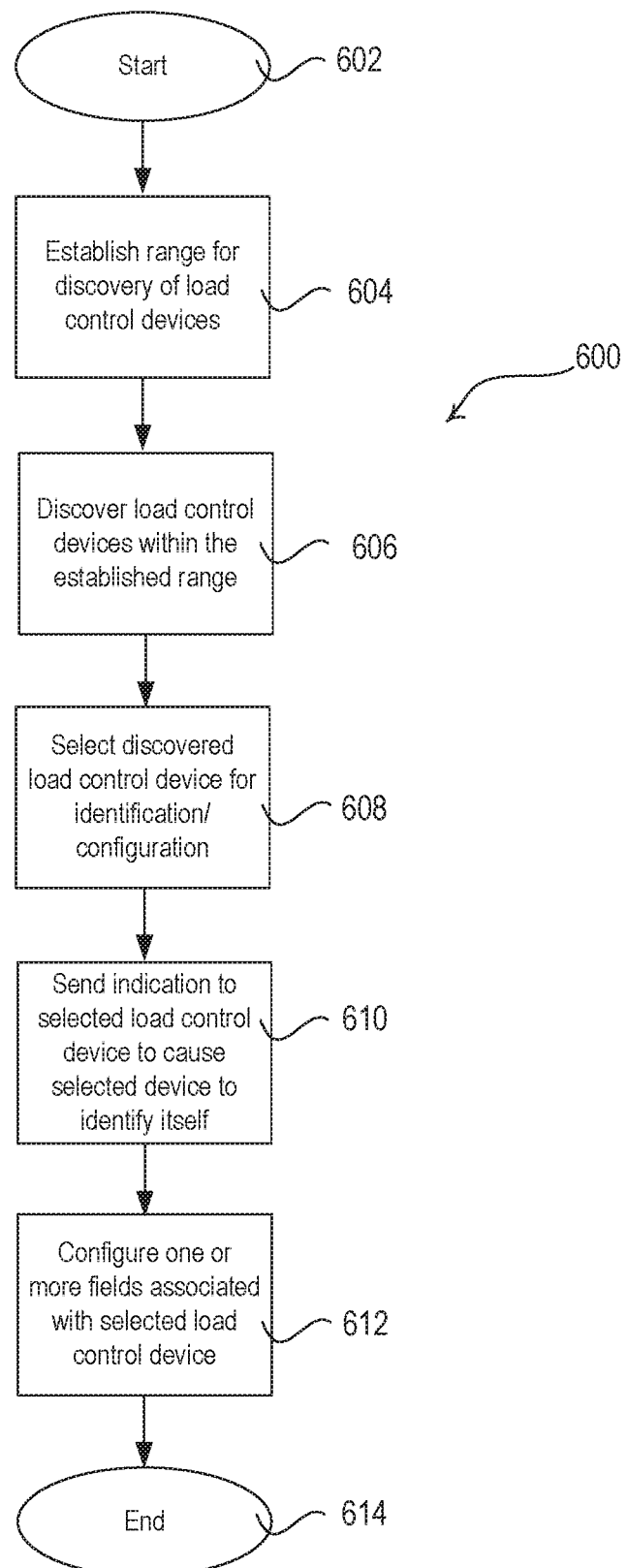
FIG. 6 is a simplified flow diagram depicting an example method for discovering and configuring load control devices.

FIG. 6 is a simplified block diagram depicting an example method 600 for discovery and identification of load control devices. As shown in FIG. 6, the method 600 may begin at 602. At 604, a range may be established within which load control devices may be discovered. The range may be established by configuring a wireless signal to cover a defined area or by disregarding information obtained from outside of the defined area, for example. Load control devices may be discovered within the established range at 606. At 608, a discovered device may be selected for identification and/or configuration. The user device may send an indication to the selected device at 610 to cause the selected device to identify itself. For example, a user device may instruct a lighting control device to flash a corresponding lighting load for identification. A user may identify the selected device based on the identification provided by the device and at 612 one or more fields associated with the selected device may be configured. For example, a load control device may be renamed after identification. The method 600 may end at 614.

Figure 7:
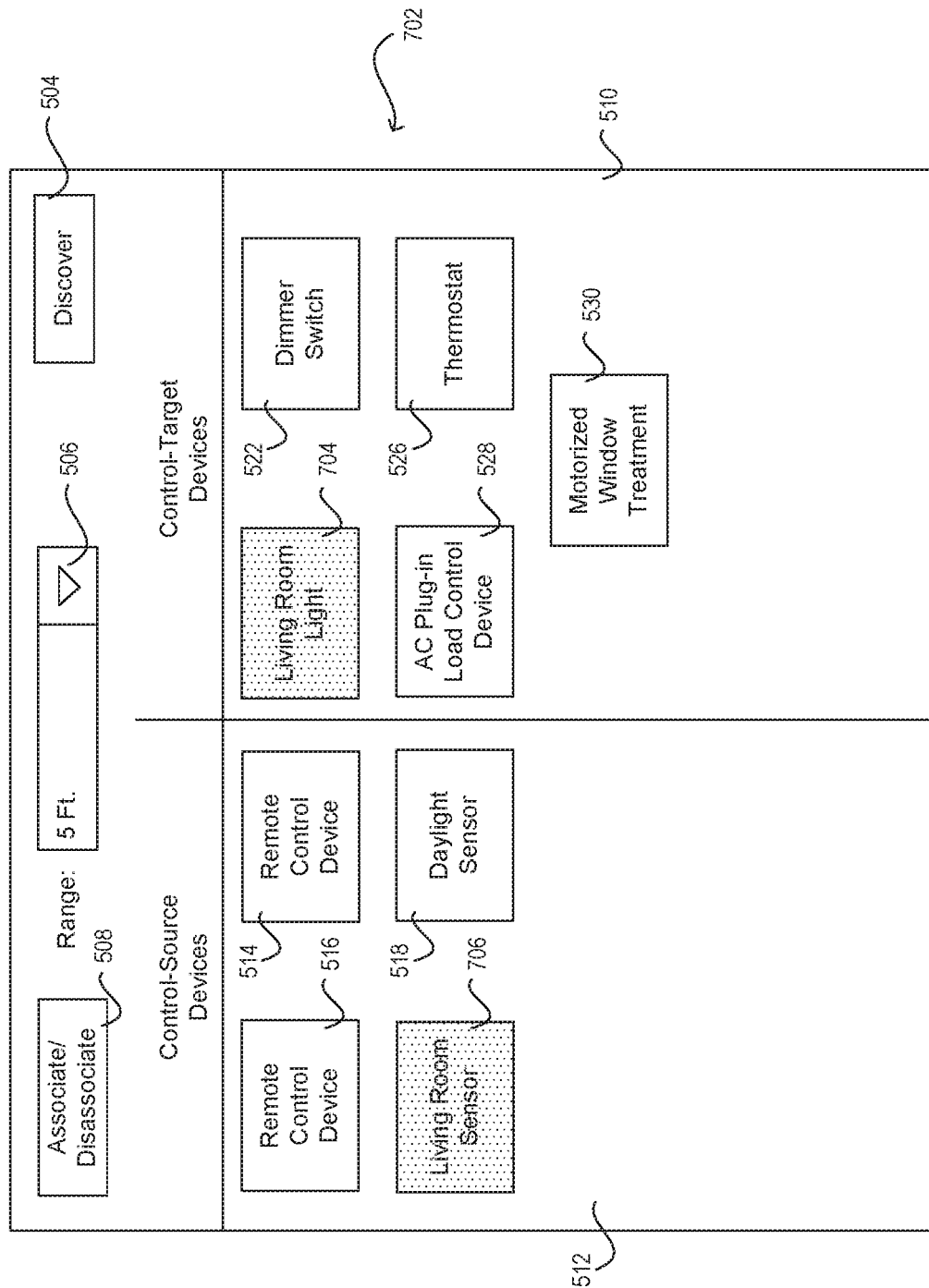
FIG. 7 depicts an example GUI for association and/or disassociation of load control devices.

FIG. 7 depicts an example GUI 702 for association and/or disassociation of load control devices. The GUI 702 may be similar to the GUI 502. The GUI 702 shows the living room light 704 and the living room sensor 706. The living room light 704 and the living room sensor 706 may be renamed from the dimmer switch 524 and the occupancy sensor 520, respectively. The living room light 704 and the living room sensor 706 may be renamed after identification, for example. The living room light 704 and the living room sensor 706 may be indicated for association and the association button 508 may be selected. The user device may store an association of the living room light 704 and the living room sensor 706 for enabling control of the living room light 704 via the living room sensor 706. The user device may send the association information or an identifier (e.g., serial number or link address) of the living room sensor 706 to the lighting control device controlling living room light 704, such that the lighting control device recognizes digital messages from the living room sensor 706. The GUI 702 may separately identify each association between load control devices. Association of control-source devices 512 may be prevented by the GUI 702 or the device on which the GUI 702 may be displayed. Association of control-target devices 510 may be prevented by the GUI 702 or the device on which the GUI 702 may be displayed.

The discovered load control devices may be displayed and/or associated until removed from GUI 702. For example, the lighting control device controlling living room light 704 and the living room sensor 706 may be associated when they are within the established range 506 or when they are outside of the established range 506. If the lighting control device controlling the living room light 704 is outside of the established range 506, the association information or identifier of the living room sensor 706 may be sent to the lighting control device when it is within communication range of the communications module or the user device.

The GUI 702 may display existing associations that may be received from other devices. For example, the user device may obtain the association information for the lighting control device controlling living room light 704 and the living room sensor 706 from the lighting control device. The GUI 702 may display the living room light 704 and the living room sensor 706 as being associated devices. The user device may determine from the association information that the lighting control device for controlling the living room light 704 is a control-target device and that the living room sensor 706 is a control-source device. The living room light 704 may be displayed with the control-target devices 510 and the living room sensor 706 may be displayed with the control-source devices 512.

The GUI 702 may be used for disassociation of control-target devices 510 and control-source devices 512. For example, the associated lighting control device for controlling living room light 704 and living room sensor 706 may be indicated by a user and the user may select the button 508 for disassociation. In another example, the GUI 702 may include an independent button (not shown) for disassociation. Upon selection of the disassociation button 508, the user device may remove the stored association of the lighting control device for the living room light 704 and the living room sensor 706 to disable control of the living room light 704 via the living room sensor 706. The user device may instruct the lighting control device to remove the association information or identifier of the living room sensor 706 such that the lighting control device does not act on digital messages received from the living room sensor 706.

Figure 8A:
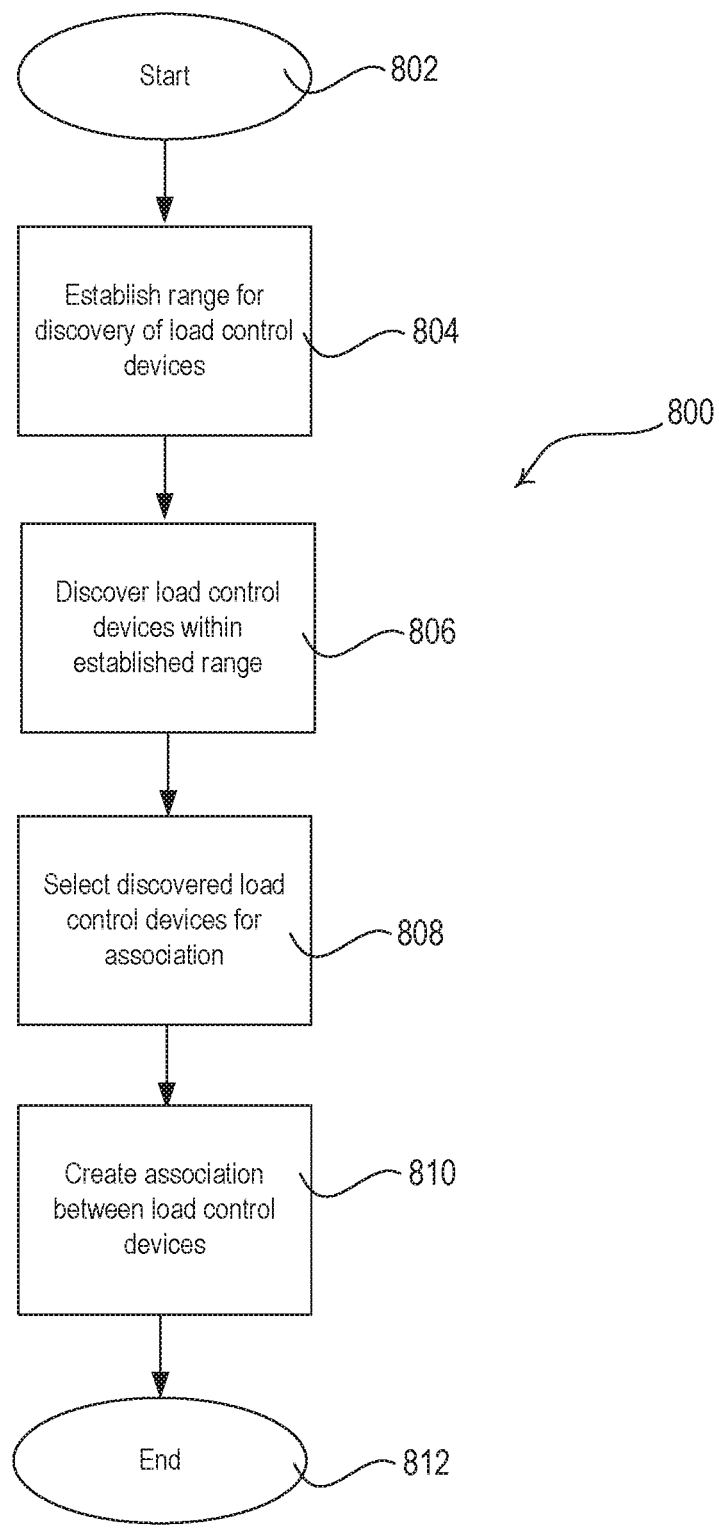
FIG. 8A is a simplified flow diagram depicting an example method for discovery and association of load control devices.

FIG. 8A is a block diagram of an example method 800 for discovery and association of load control devices. As shown in FIG. 8A, the method 800 may begin at 802. At 804, a range may be established within which load control devices may be discovered. The range may be established by configuring a signal strength to cover a defined area or by disregarding information obtained from outside of the defined area. Load control devices may be discovered within the established range at 806. At 808, discovered load control devices may be selected for association. For example, a control-source device may be selected for association with one or more control-target devices. The selected load control devices may be associated at 810. The user device may store the association locally and/or send the association to another device. Each control-target device may receive the association information or an identifier of the control-source device and may maintain a registry of associated control-source devices. At 812, the method 800 may end.

Figure 8B:
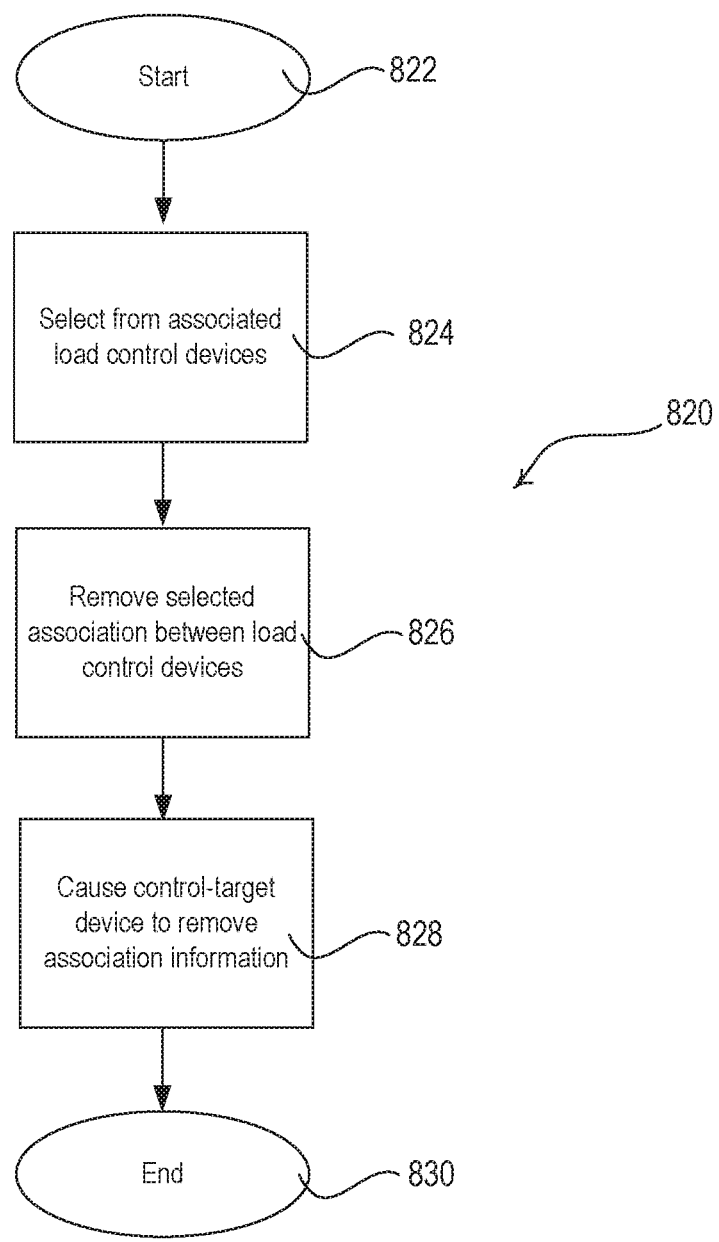
FIG. 8B is a simplified flow diagram depicting an example method for disassociation of load control devices.

FIG. 8B is a block diagram of an example method 820 for disassociating load control devices. As shown in FIG. 8B, the method 820 may begin at 822. At 824, one or more associations may be selected. The associations may be selected by selecting one or more of the associated devices or by selecting the association itself. One or more associations may be selected at a time for disassociation. The selected associations maybe removed at 826. The association may be removed from a registry of associations stored at the user device. The remaining associations may be maintained in the registry or may also be removed along with the selected association.

At 828, instructions may be sent to each control-target device in the selected associations to cause the control-target device to remove the association from memory. A control-target device may receive an indication to remove association information or the stored identifier of an associated control-source device from its registry. After the control-target device removes the association information or stored identifier of the control-source device, the control-target device may be unable to recognize and/or execute, or may disregard, digital messages from the disassociated control-source device. The control-target device may maintain any other associations or identifiers of associated control-source devices within its registry. In another example, the control-target device may receive an indication to remove each of its stored associations from its registry. At 830, the method 820 may end.

Figure 9:
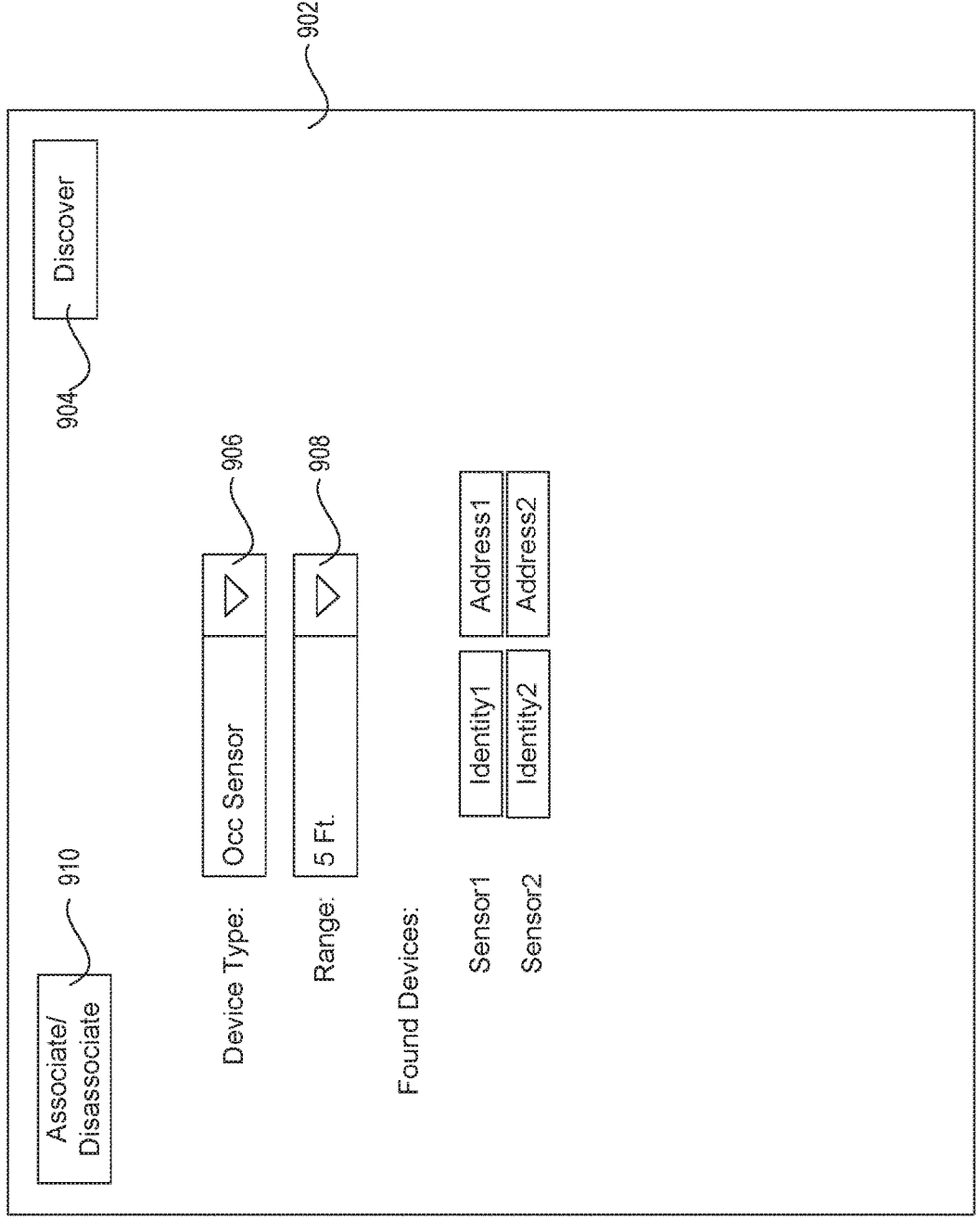
FIG. 9 depicts an example GUI for performing discovery, association, and/or disassociation of load control devices using a device type.

FIG. 9 depicts an example GUI 902 that may be used for performing discovery of load control devices using a device type. A user may select the device type 906 and/or the established range 908 for discovery, association, and/or disassociation. The device type 906 may include any type of load control device, such as a lighting control device, a motorized window treatment, an AC plug-in load control device, a remote control device, a temperature control device (e.g., thermostat), a daylight sensor, or an occupancy sensor, for example. The device type 906 may be used to discover control-source devices or control-target devices. The device type 906 may be limited to load control devices capable of two-way communication. The discovery button 904 may be selected to discover devices having the device type 906 and which are in the established range 908. The GUI 902 may display the discovered devices, their device type, their identity, and/or their link address. The found devices may be associated or disassociated using the association button 910.

Figure 10:
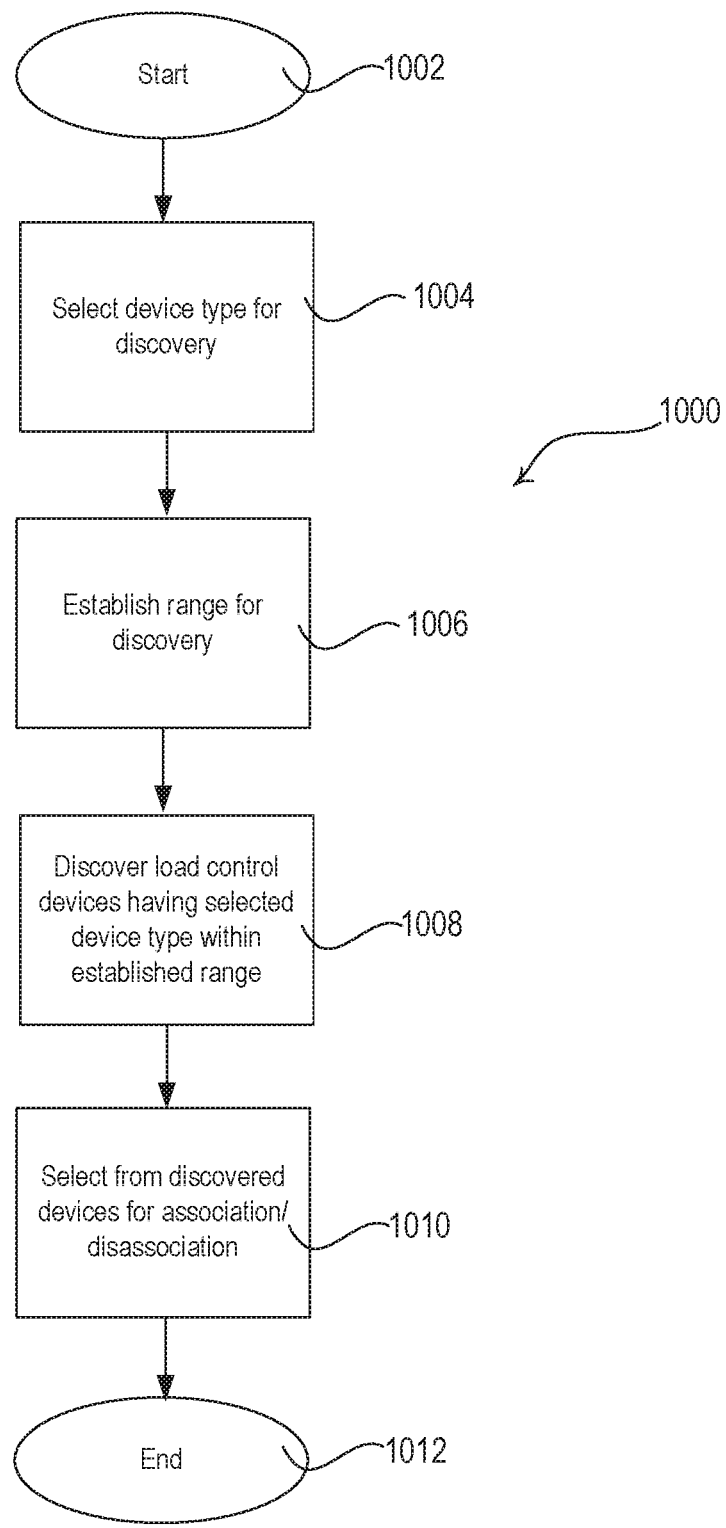
FIG. 10 is a simplified flow diagram depicting an example method for performing discovery, association, and/or disassociation of load control devices using a device type.

FIG. 10 is a block diagram of an example method 1000 for discovery, association, and/or disassociation of load control devices. As shown in FIG. 10, the method 1000 may begin at 1002. At 1004, one or more load control device types may be selected for discovery. A range may be established at 1006 for performing discovery of load control devices. As described herein, the range may be established using a configurable wireless signal or by disregarding information received from outside of the established range. At 1008, load control devices may be discovered that have the selected device type and which are within the established range of the user device.

The load control devices having the selected device type may be discovered at 1008 by transmitting a discovery message that includes an indication of the types of load control devices that should respond. For example, the discovery message may include a bit, series of bits, or a code that indicates the selected device type. One or more device types may be selected and/or indicated in the discovery message. The load control devices that receive the discovery message may compare the device type indicated in the discovery message with their own device type. If the load control device is within the indicated device type, the load control device may respond to the discovery message with a response message. If the load control device is not within the indicated device type, the load control device may refrain from responding.

In another example, the user device may determine whether the load control devices have the selected device type. The user device may transmit a discovery message and may receive a response to the discovery message that includes an indication of the type of load control device responding. For example, the response message may include a device identifier, a link address, a bit, a series of bits, or a code that indicates the device type. The user device may compare the device type indicated in the response message with the selected device type. If the load control device is within the selected device type, the load control device may be included in the discovered load control devices. If the load control device is not within the selected device type, the information from the load control device may be disregarded. At 1010, a user may select one or more of the discovered load control devices for association or disassociation. The method 1000 may end at 1012.

Figure 11:
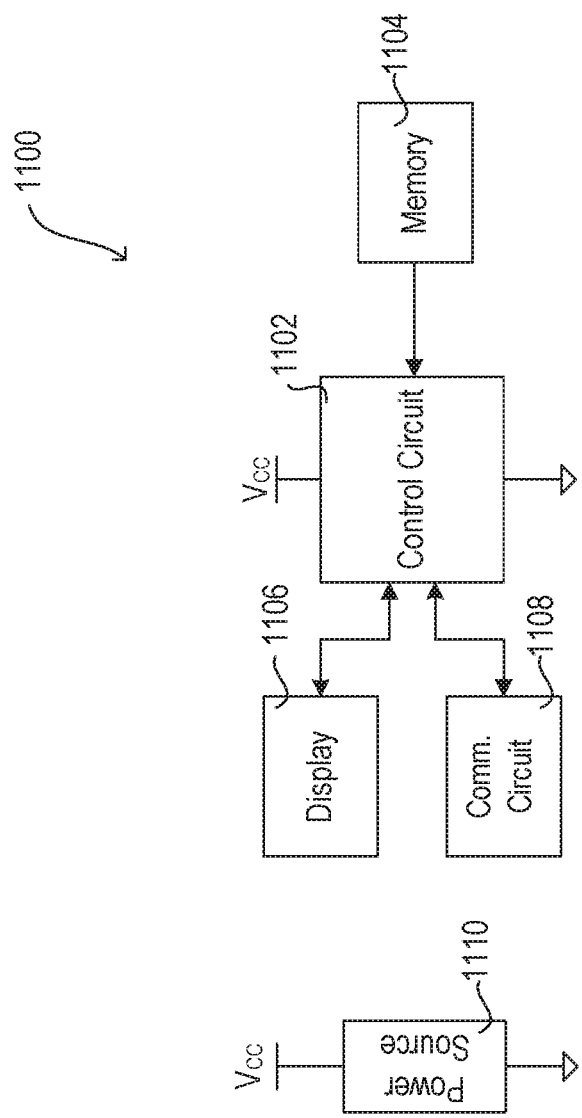
FIG. 11 is a block diagram depicting an example user device for performing discovery, association, and/or disassociation of load control devices.

FIG. 11 is a block diagram illustrating an example user device 1100 as described herein. The user device 1100 may include the user device 328 or user device 404, for example. The user device 1100 may include a control circuit 1102 for controlling the functionality of the user device 1100. The control circuit 1102 may include one or more general purpose processors, special purpose processors, conventional processors, digital signal processors (DSPs), microprocessors, integrated circuits, a programmable logic device (PLD), application specific integrated circuits (ASICs), or the like. The control circuit 1102 may perform signal coding, data processing, power control, input/output processing, or any other functionality that enables the user device 1100 to perform as described herein. The control circuit 1102 may store information in and/or retrieve information from the memory 1104. The memory 1104 may include a non-removable memory and/or a removable memory. The non-removable memory may include random-access memory (RAM), read-only memory (ROM), a hard disk, or any other type of non-removable memory storage. The removable memory may include a subscriber identity module (SIM) card, a memory stick, a memory card, or any other type of removable memory.

The user device 1100 may include a communications circuit 1108 for transmitting and/or receiving information. The communications circuit 1108 may perform wireless or wired communications. The communications circuit 1108 may include the functionality of, or may be capable of performing communications with, communications module 330 or 406. The communications circuit 1108 may include an RF transceiver or other circuit capable of performing wireless communications via an antenna. Communications circuit 1108 may be in communication with control circuit 1102 for transmitting and/or receiving information.

The control circuit 1102 may also be in communication with a display 1106 for providing information to a user. The display 1106 and the control circuit 1102 may be in two-way communication, as the display 1106 may include a touch screen module capable of receiving information from a user and providing such information to the control circuit 1102. Each of the modules within the user device 1100 may be powered by a power source 1110. The power source 1110 may include an AC power supply or DC power supply, for example. The power source 1110 may generate a supply voltage $V_{CC}$ for powering the modules within the user device 1100.

Figure 12:
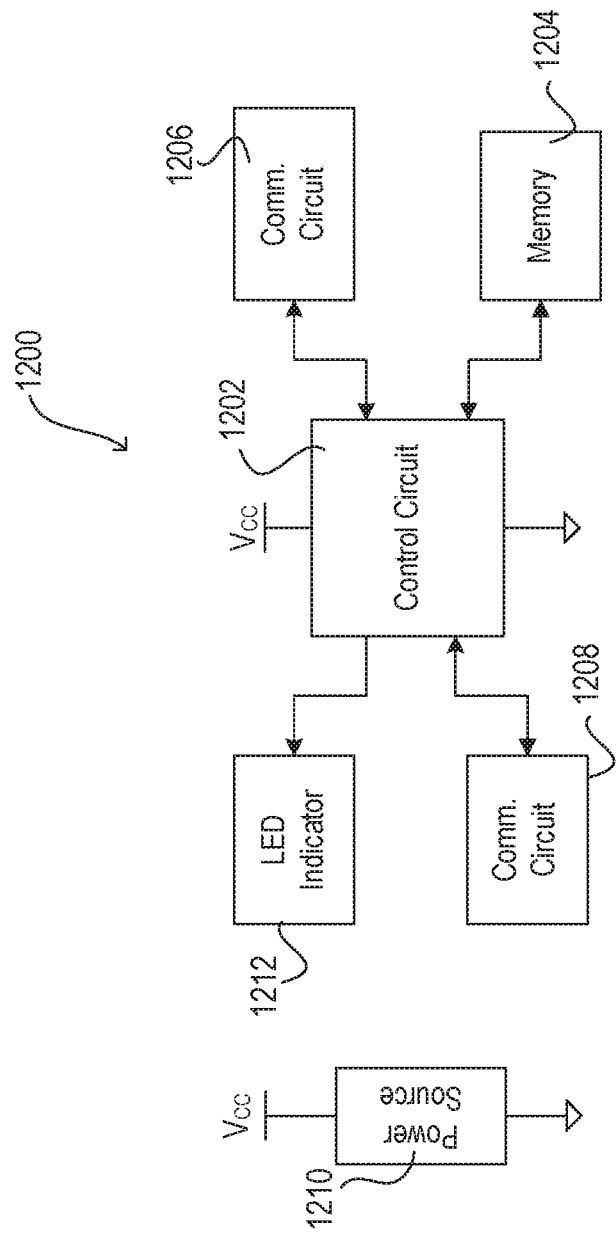
FIG. 12 is a block diagram depicting an example communications module for performing discovery, association, and/or disassociation of load control devices.

FIG. 12 is a block diagram illustrating an example communications module 1200 as described herein. The communications module 1200 may include communications modules 330 or 406, for example. The communications module 1200 may include a control circuit 1202 for controlling the functionality of the communications module 1200. The control circuit 1202 may include one or more general purpose processors, special purpose processors, conventional processors, digital signal processors (DSPs), microprocessors, integrated circuits, a programmable logic device (PLD), application specific integrated circuits (ASICs), or the like. The control circuit 1202 may perform signal coding, data processing, power control, input/output processing, or any other functionality that enables the communications module 1200 to perform as described herein. The control circuit 1202 may store information in and/or retrieve information from the memory 1204. The memory 1204 may include a non-removable memory and/or a removable memory. The non-removable memory may include random-access memory (RAM), read-only memory (ROM), a hard disk, or any other type of non-removable memory storage. The removable memory may include a subscriber identity module (SIM) card, a memory stick, a memory card, or any other type of removable memory.

The communications module 1200 may include a communications circuit 1206 for transmitting and/or receiving information. The communications circuit 1206 may perform wireless or wired communications. The communications module 1200 may also, or alternatively, include a communications circuit 1208 for transmitting and/or receiving information. The communications circuit 1206 may perform wireless or wired communications. Communications circuits 1206 and 1208 may be in communication with control circuit 1202. The communications circuits 1206 and 1208 may include an RF transceiver or other communications module capable of performing wireless communications via an antenna. The communications circuit 1206 and communications circuit 1208 may be capable of performing communications via different communication channels. For example, the communications circuit 1206 may be capable of communicating with a user device via a wireless communication channel (e.g., BLUETOOTH® or near field communication) and the communications circuit 1208 may be capable of communicating with load control devices via another wireless communication channel (e.g., WI-FI® or a proprietary communication channel, such as CLEAR CONNECT™).

The control circuit 1202 may be in communication with an LED indicator 1212 for providing indications to a user. Each of the modules within the wireless communications module 1200 may be powered by a power source 1210. The power source 1210 may include an AC power supply or DC power supply, for example. The power source 1210 may generate a supply voltage $V_{CC}$ for powering the modules within the communications module 1200.

Figure 13:
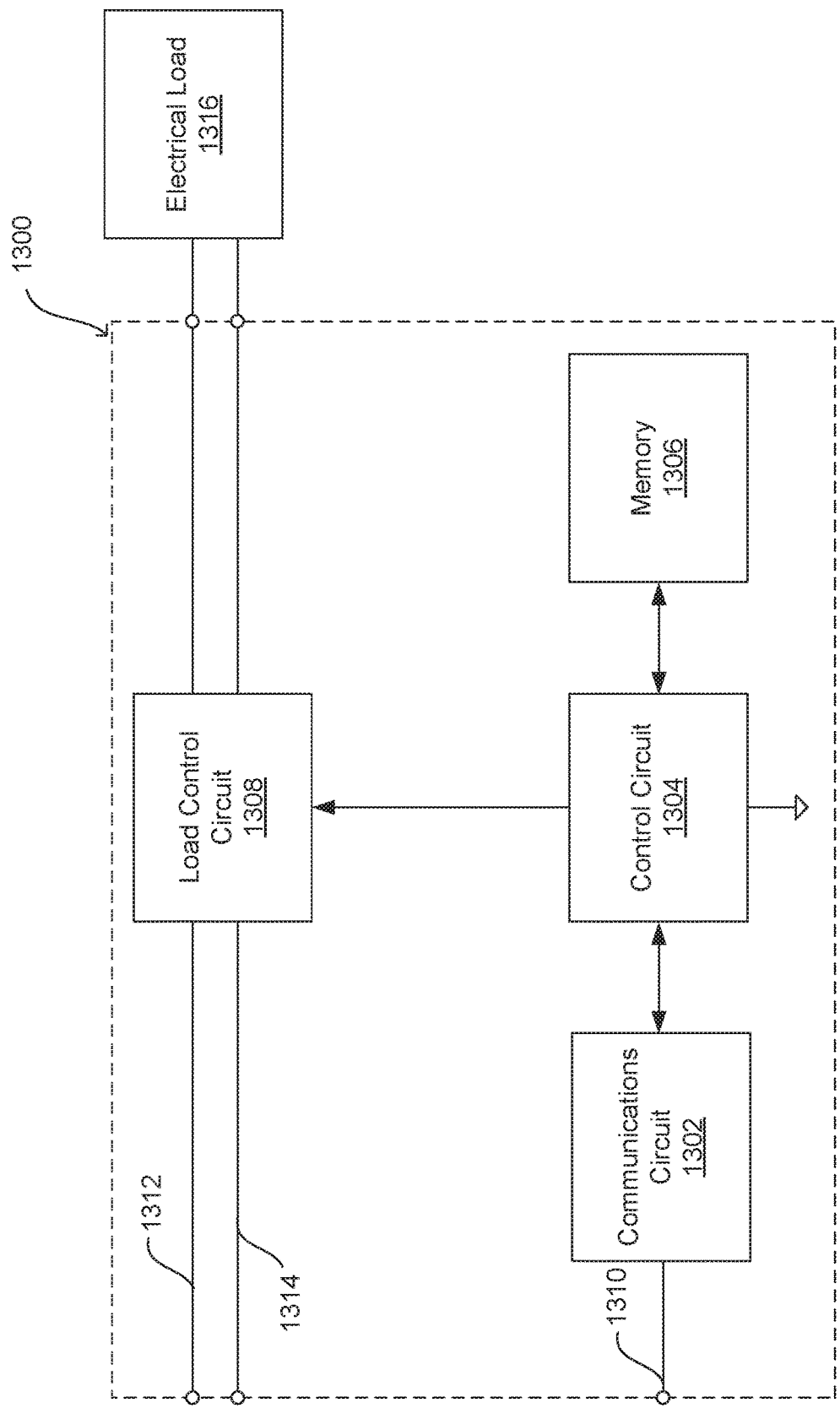
FIG. 13 is a block diagram depicting an example control-target device.

FIG. 13 is a block diagram illustrating an example control-target device, e.g., a load control device 1300, as described herein. The load control device 1300 may be a dimmer switch, an electronic switch, an electronic ballast for lamps, an LED driver for LED light sources, an AC plug-in load control device, a temperature control device (e.g., a thermostat), a motor drive unit for a motorized window treatment, or other load control device. The load control device 1300 may include a communications circuit 1302. The communications circuit 1302 may include a receiver, an RF transceiver or other communications module capable of performing wired and/or wireless communications via communications link 1310. The communications circuit 1302 may be in communication with control circuit 1304. The control circuit 1304 may include one or more general purpose processors, special purpose processors, conventional processors, digital signal processors (DSPs), microprocessors, integrated circuits, a programmable logic device (PLD), application specific integrated circuits (ASICs), or the like. The control circuit 1304 may perform signal coding, data processing, power control, input/output processing, or any other functionality that enables the load control device to perform as described herein.

The control circuit 1304 may store information in and/or retrieve information from the memory 1306. For example, the memory 1306 may maintain a registry of associated load control devices. The memory 1306 may include a non-removable memory and/or a removable memory. The load control circuit 1308 may receive instructions from the control circuit 1304 and may control the electrical load 1316 based on the received instructions. The load control circuit 1308 may receive power via the hot connection 1312 and the neutral connection 1314 and may provide an amount of power to the electrical load 1316. The electrical load 1316 may include any type of electrical load.

Figure 14:
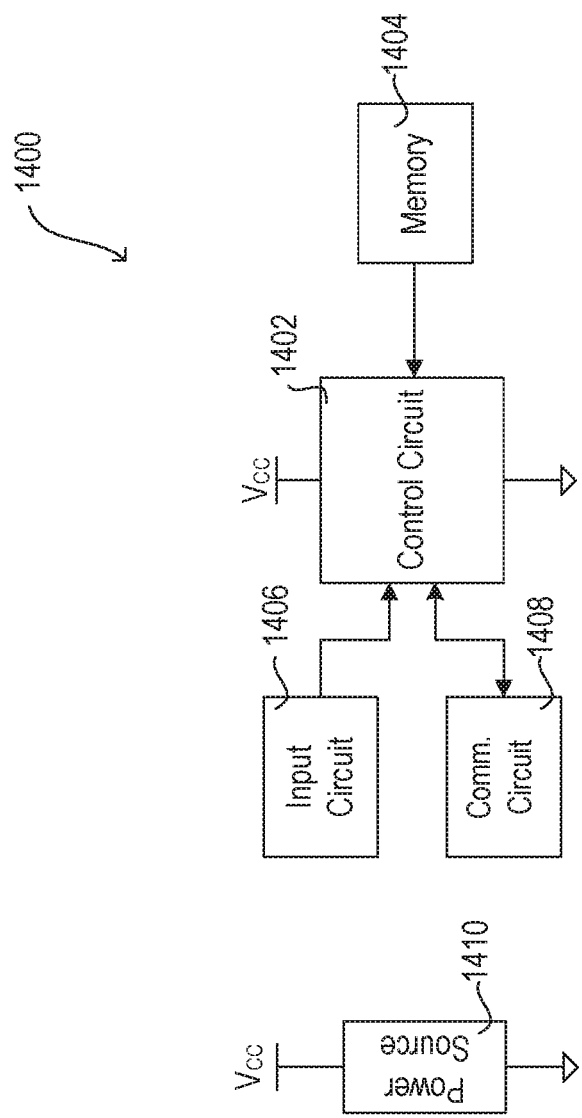
FIG. 14 is a block diagram depicting an example control-source device.

FIG. 14 is a block diagram illustrating an example control-source device 1400 as described herein. The control-source device may be a remote control device, an occupancy sensor, a daylight sensor, a temperature sensor, and/or the like. The control-source device 1400 may include a control circuit 1402 for controlling the functionality of the user device 1400. The control circuit 1402 may store information in and/or retrieve information from the memory 1404. The memory 1404 may include a non-removable memory and/or a removable memory.

The control-source device 1400 may include a communications circuit 1408 for transmitting and/or receiving information. The communications circuit 1408 may transmit and/or receive information via wired or wireless communications. The communications circuit 1408 may include a transmitter, an RF transceiver, or other circuit capable of performing wired and/or wireless communications. The communications circuit 1408 may be in communication with control circuit 1402 for transmitting and/or receiving information.

The control circuit 1402 may also be in communication with an input circuit 1406. The input circuit 1406 may include a button or a sensor circuit (e.g., an occupancy sensor circuit, a daylight sensor circuit, or a temperature sensor circuit) for receiving input that may be sent to a device for controlling an electrical load. The control circuit 1402 may receive information from the input circuit 1406 (e.g., an indication that a button has been actuated or sensed information). The control circuit 1402 may retrieve load control instructions from the memory 1404 based on the information received from the input circuit 1406. The control circuit 1402 may send the information received from the input circuit 1406 to another device via the communications circuit 1408. Each of the modules within the user device 1400 may be powered by a power source 1410.

Although features and elements are described herein in particular combinations, each feature or element can be used alone or in any combination with the other features and elements. The methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), removable disks, and optical media such as CD-ROM disks, and digital versatile disks (DVDs).

The invention claimed is:

1. A non-transitory, machine-readable, storage device that includes instructions that, when executed by mobile device processor circuitry, cause the mobile device processor circuitry to:
   receive data representative of a selected discovery range selected from a plurality of discovery ranges;
   select a transmission signal strength corresponding to the selected discovery range;
   communicate a broadcast discovery message at the selected transmission signal strength;
   receive a respective response signal from each of one or more control-source devices, each of the control-source devices within the selected discovery range;
   receive a respective response signal from each of one or more control-target devices, each of the control-target devices within the selected discovery range;
   generate user interface that includes data representative of each respective one of the one or more control-source devices and each respective one of the one or more control-target devices;
   receive data indicative of a relationship between at least one of the one or more control-source devices and at least one of the one or more control-target devices; and
   communicate to the at least one control target device data representative of the relationship between the respective at least one control-target device and the at least one control-source device.

2. The non-transitory, machine-readable, storage device of claim 1 wherein the instructions, when executed by the mobile device processor circuitry, further cause the mobile device processor circuitry to:
   determine, for each received response signal from each of the one or more control-target devices, a return signal strength for the respective response signal;
   determine whether each of the one or more control-target devices falls within the selected discovery range using the determined RSSI associated with the respective control-target device;
   determine, for each received response signal from each of the one or more control-source devices, a return signal strength for the respective response signal; and
   determine whether each of the one or more control-target devices falls within the selected discovery range using the determined RSSI associated with the respective control-source device.

3. The non-transitory, machine-readable, storage device of claim 1 wherein the instructions that cause the mobile device processor circuitry to communicate a broadcast discovery message further cause the mobile device processor circuitry to:
   communicate a broadcast discovery message that includes data representative of at least one of: one or more control-source device types and one or more control-target device types.

4. The non-transitory, machine-readable, storage device of claim 3 wherein the instructions that cause the mobile device processor to receive a respective response signal from each of one or more control-source devices within the selected discovery range further causes the mobile device processor circuitry to:
   receive a respective response signal from the one or more control-source devices within the selected discovery range that match the one or more selected control-source device types.

5. The non-transitory, machine-readable, storage device of claim 3 wherein the instructions that cause the mobile device processor to receive a respective response signal from each of one or more control-target devices within the selected discovery range further causes the mobile device processor circuitry to:
   receive a respective response signal from the one or more control-target devices within the selected discovery range that match the one or more selected control-target device types.

6. The non-transitory, machine-readable, storage device of claim 3 wherein the instructions that cause the mobile device processor to receive a respective response signal from each of one or more control-source devices within the selected discovery range further causes the mobile device processor circuitry to:
   from each of the one or more control-source devices within the selected discovery range receive a respective response signal that includes at least one of: data representative of a device type; data representative of a network link address; and data representative of a unique device identifier.

7. The non-transitory, machine-readable, storage device of claim 3 wherein the instructions that cause the mobile device processor to receive a respective response signal from each of one or more control-target devices within the selected discovery range further causes the mobile device processor circuitry to:
   from each of the one or more control-target devices within the selected discovery range receive a respective response signal that includes at least one of: data representative of a device type; data representative of a network link address; and data representative of a unique device identifier.

8. The non-transitory, machine-readable, storage device of claim 1 wherein the instructions, when executed by the mobile device processor circuitry, further cause the mobile device processor circuitry to:
   communicate to the at least one control-source device the data representative of the relationship between the respective at least one control-target device and the at least one control-source device.

9. The non-transitory, machine-readable, storage device of claim 1 wherein the instructions, when executed by the mobile device processor circuitry, further cause the mobile device processor circuitry to:
   communicate to a system controller the data representative of the relationship between the at least one control-target device and the at least one control-source device.

10. The non-transitory, machine-readable, storage device of claim 1 wherein the instructions that cause the mobile device processor circuitry to communicate to the at least one control target device data representative of the relationship between the respective at least one control-target device and the at least one control-source device further cause the mobile device processor circuitry to:

communicate to the at least one control target device the data representative of the relationship between the respective at least one control-target device and the at least one control-source device via a first network using a first network protocol.

11. The non-transitory, machine-readable, storage device of claim 1 wherein the instructions that cause the mobile device processor circuitry to communicate to the system controller data representative of the at least one relationship between the at least one control-target device and the at least one control-source device further cause the mobile device processor circuitry to:

communicate to the system controller the data representative of the relationship between the respective at least one control-target device and the at least one control-source device via a first network using a first network protocol via a second network using a second network protocol.

12. A mobile device processor circuit to:

receive data representative of a selected discovery range selected from a plurality of discovery ranges;

select a transmission signal strength corresponding to the selected discovery range;

communicate a broadcast discovery message at the selected transmission signal strength;

receive a respective response signal from each of one or more control-source devices, each of the control-source devices within the selected discovery range;

receive a respective response signal from each of one or more control-target devices, each of the control-target devices within the selected discovery range;

generate user interface that includes data representative of each respective one of the one or more control-source devices and each respective one of the one or more control-target devices;

receive data indicative of a relationship between at least one of the one or more control-source devices and at least one of the one or more control-target devices; and communicate to the at least one control target device data representative of the relationship between the respective at least one control-target device and the at least one control-source device.

13. The mobile device processor circuit of claim 12, the mobile device processor circuit to further:

determine, for each received response signal from each of the one or more control-target devices, a return signal strength for the respective response signal;

determine whether each of the one or more control-target devices falls within the selected discovery range using the determined RSSI associated with the respective control-target device;

determine, for each received response signal from each of the one or more control-source devices, a return signal strength for the respective response signal; and determine whether each of the one or more control-target devices falls within the selected discovery range using the determined RSSI associated with the respective control-source device.

14. The mobile device processor circuit of claim 12 wherein to communicate the broadcast discovery message, the mobile device processor circuitry to further:

communicate a broadcast discovery message that includes data representative of at least one of: one or more control-source device types and one or more control-target device types.

15. The mobile device processor circuit of claim 14 wherein to receive the respective response signal from each of the one or more control-source devices within the selected discovery range, the mobile device processor circuitry to further:

receive the respective response signal from the one or more control-source devices within the selected discovery range that match the one or more selected control-source device types.

16. The mobile device processor circuit of claim 14 wherein to receive the respective response signal from each of the one or more control-target devices within the selected discovery range, the mobile device processor circuitry to further:

receive the respective response signal from the one or more control-target devices within the selected discovery range that match the one or more selected control-target device types.

17. The mobile device processor circuit of claim 14 wherein to receive the respective response signal from each of the one or more control-source devices within the selected discovery range, the mobile device processor circuitry to further:

receive, from each of the one or more control-source devices within the selected discovery range, a respective response signal that includes at least one of: data representative of a device type; data representative of a network link address; and data representative of a unique device identifier.

18. The mobile device processor circuit of claim 14 wherein to receive the respective response signal from each of one or more control-target devices within the selected discovery range further causes the mobile device processor circuitry to:

from each of the one or more control-target devices within the selected discovery range receive a respective response signal that includes at least one of: data representative of a device type; data representative of a network link address; and data representative of a unique device identifier.

19. The mobile device processor circuit of claim 12, the mobile device processor circuit to further:

communicate to the at least one control-source device the data representative of the relationship between the respective at least one control-target device and the at least one control-source device.

20. The mobile device processor circuit of claim 12, the mobile device processor circuit to further:

communicate to a system controller the data representative of the relationship between the at least one control-target device and the at least one control-source device.

21. The mobile device processor circuit of claim 12 wherein to communicate to the at least one control target device data representative of the relationship between the respective at least one control-target device and the at least one control-source device, the mobile device processor circuitry to further:

communicate to the at least one control target device the data representative of the relationship between the respective at least one control-target device and the at least one control-source device via a first network using a first network protocol.

22. The mobile device processor circuit of claim 12 wherein to communicate to the system controller data representative of the at least one relationship between the at least one control-target device and the at least one control-source device, the mobile device processor circuitry to further:
   communicate to the system controller the data representative of the relationship between the respective at least one control-target device and the at least one control-source device via a first network using a first network protocol via a second network using a second network protocol.

* * * * *